US010935438B2

(12) United States Patent
Kim

(10) Patent No.: US 10,935,438 B2
(45) Date of Patent: Mar. 2, 2021

(54) TEMPERATURE SENSOR AND METHOD OF SENSING TEMPERATURE

(71) Applicant: SAMSUNG ELECTRONICS CO., LTD., Suwon-si (KR)

(72) Inventor: JongPal Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 15/789,238

(22) Filed: Oct. 20, 2017

(65) Prior Publication Data

US 2018/0245992 A1 Aug. 30, 2018

(30) Foreign Application Priority Data

Feb. 28, 2017 (KR) .................... 10-2017-0026488

(51) Int. Cl.
*G01K 15/00* (2006.01)
*G01K 7/25* (2006.01)
*G01K 7/32* (2006.01)

(52) U.S. Cl.
CPC ............. *G01K 7/25* (2013.01); *G01K 7/32* (2013.01); *G01K 15/005* (2013.01)

(58) Field of Classification Search
None
See application file for complete search history.

(56) References Cited

U.S. PATENT DOCUMENTS

| | | | |
|---|---|---|---|
| 7,370,535 B2 | 5/2008 | Sugino et al. | |
| 7,474,230 B2 | 1/2009 | Blom et al. | |
| 7,914,204 B2 | 3/2011 | Kim et al. | |
| 8,031,024 B1 | 10/2011 | Zaslavsky | |
| 8,136,987 B2 | 3/2012 | Luria et al. | |
| 8,262,286 B2 * | 9/2012 | Peterson | G01K 7/01 |
| | | | 327/512 |
| 8,696,199 B2 | 4/2014 | St. Pierre et al. | |
| 8,967,856 B2 | 3/2015 | Bruset et al. | |
| 9,134,184 B2 | 9/2015 | Kamata | |
| 9,528,883 B2 * | 12/2016 | Ramaraju | G01K 7/01 |
| 2007/0195856 A1 * | 8/2007 | Blom | G01K 7/01 |
| | | | 374/117 |
| 2015/0300889 A1 | 10/2015 | Ramaraju et al. | |

FOREIGN PATENT DOCUMENTS

| | | | |
|---|---|---|---|
| JP | 5513586 B2 | 4/2014 | |
| KR | 10-0951545 B1 | 4/2010 | |
| KR | 10-0955525 B1 | 4/2010 | |
| KR | 10-1232207 B1 | 2/2013 | |

* cited by examiner

*Primary Examiner* — Aditya S Bhat
(74) *Attorney, Agent, or Firm* — NSIP Law

(57) ABSTRACT

A temperature sensor and a method of sensing a temperature are provided. The temperature sensor generates a temperature clock signal based on a control signal to adjust a nonlinearity of the temperature clock signal, and outputs a count signal by counting clocks of the temperature clock signal corresponding to a counting interval of a reference clock signal.

13 Claims, 39 Drawing Sheets

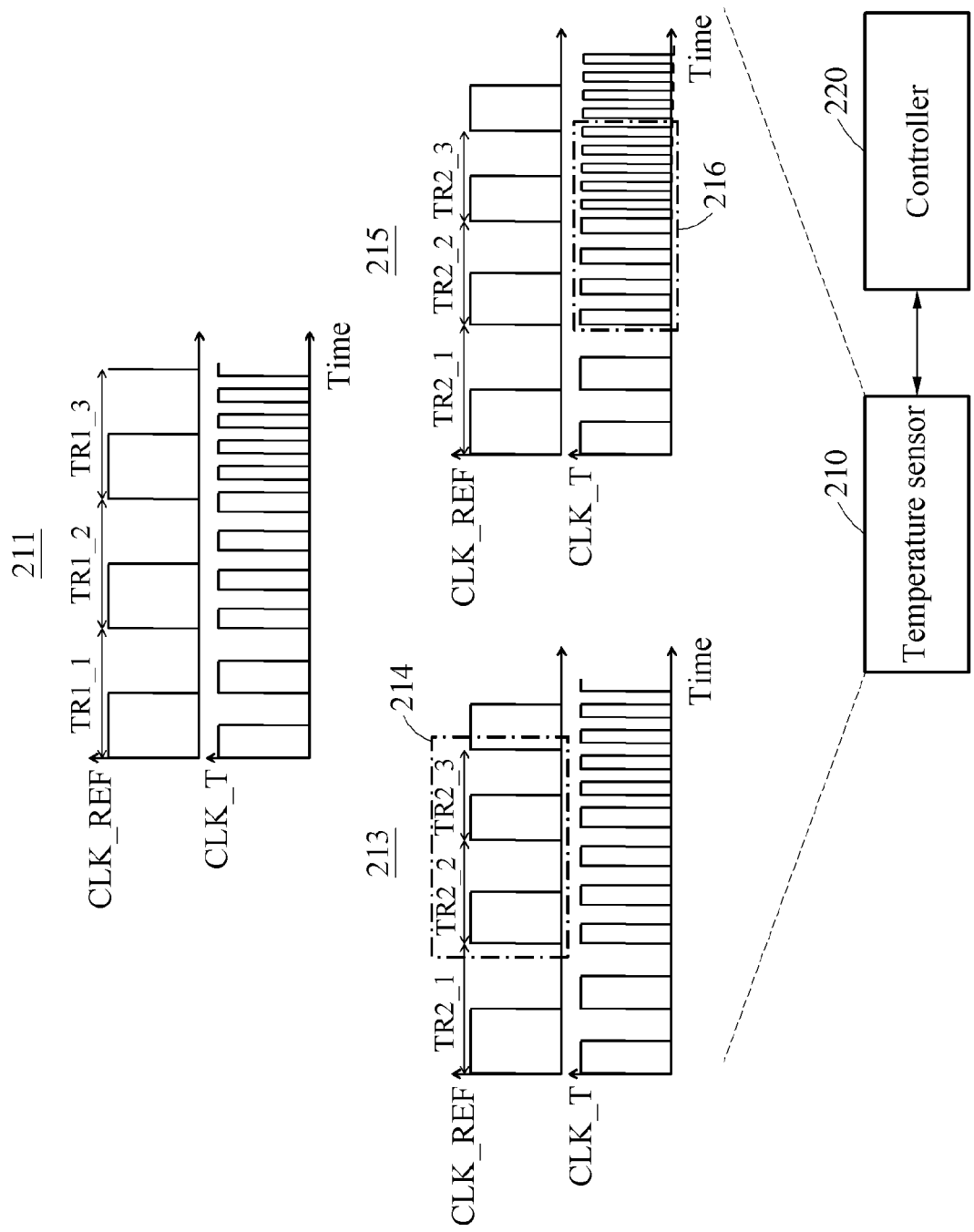

FIG. 17
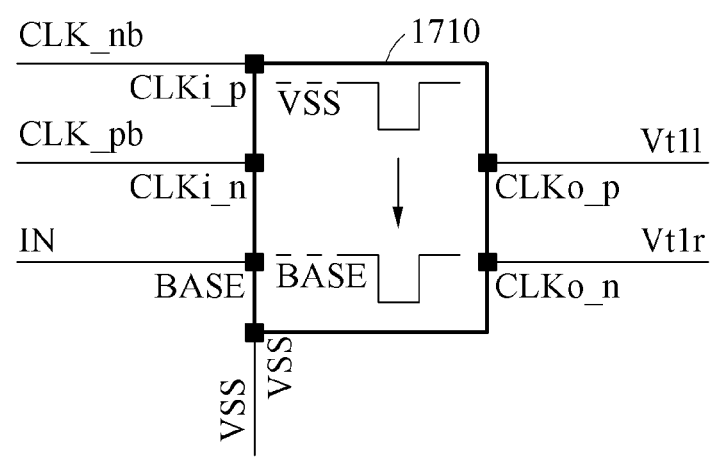
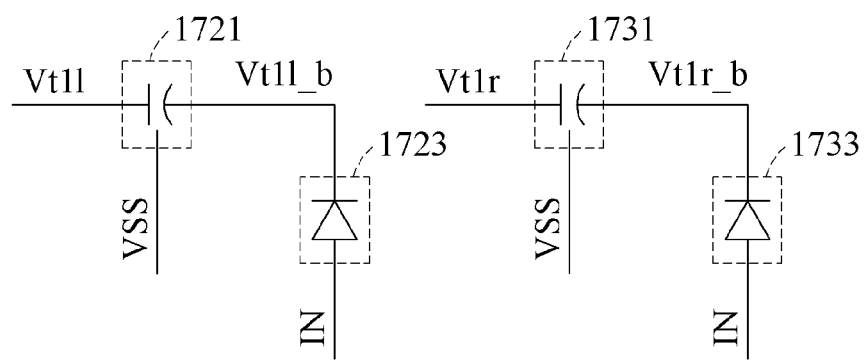

FIG. 18
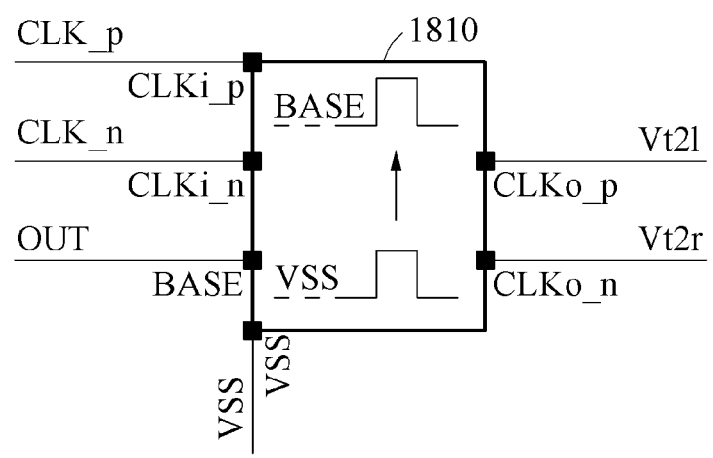
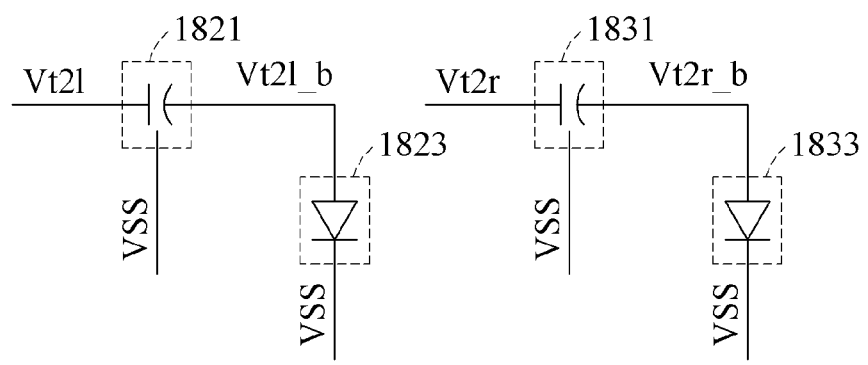

FIG. 19
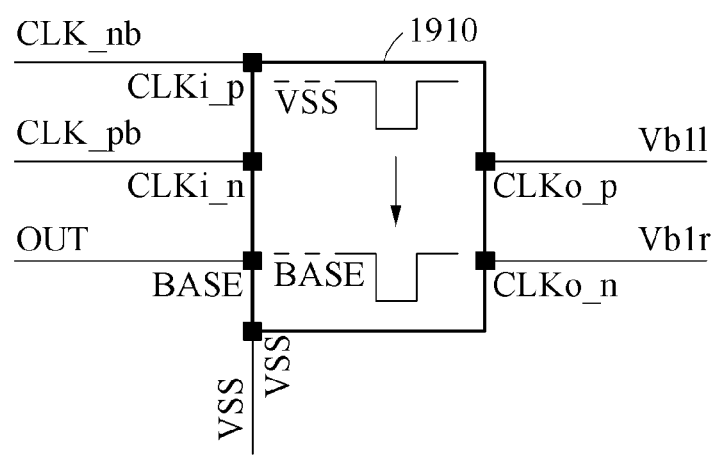
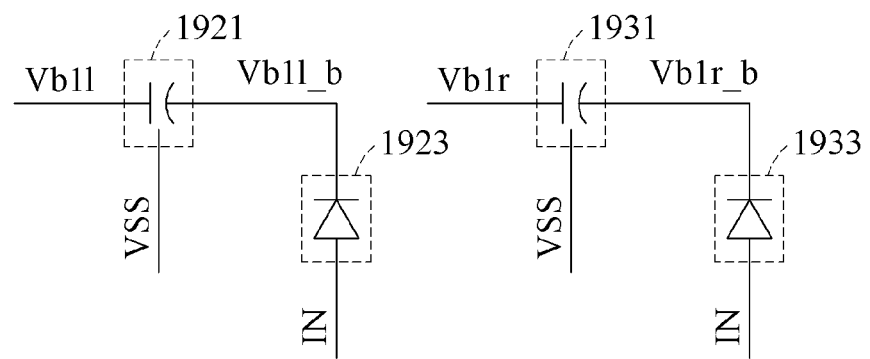

FIG. 20
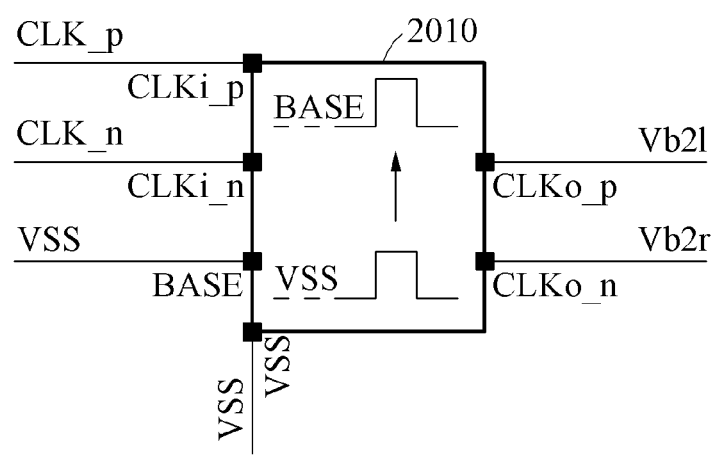
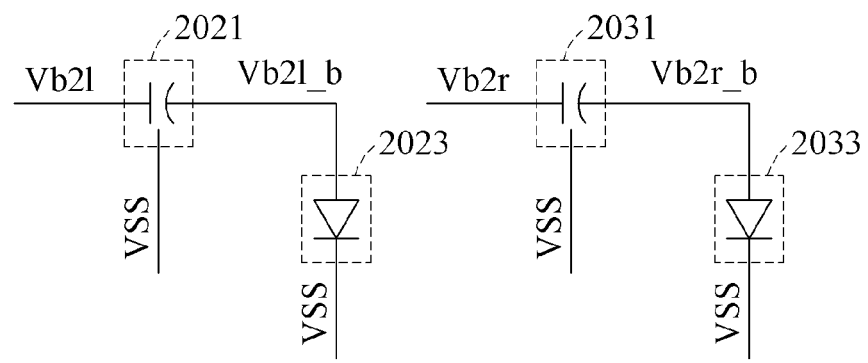

FIG. 21
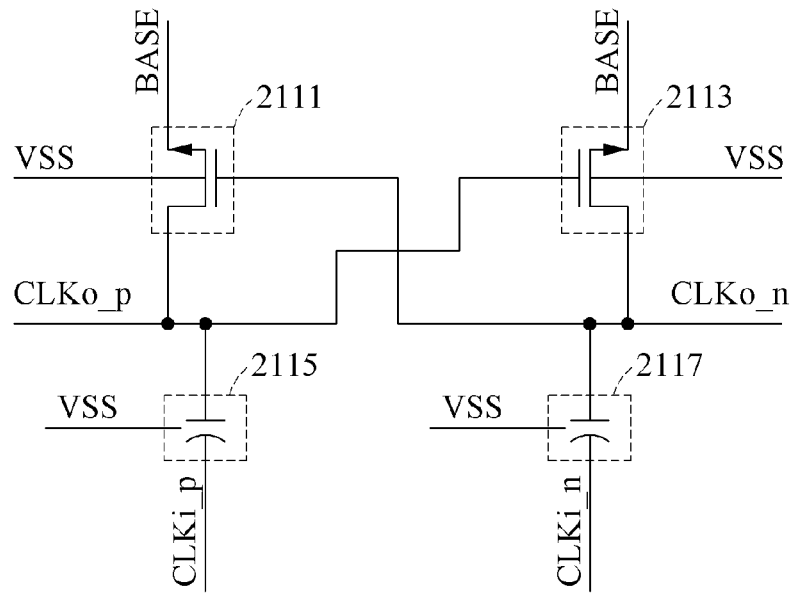
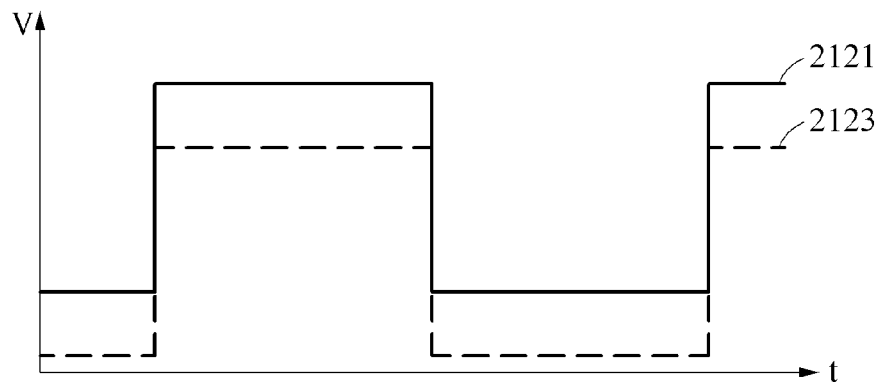
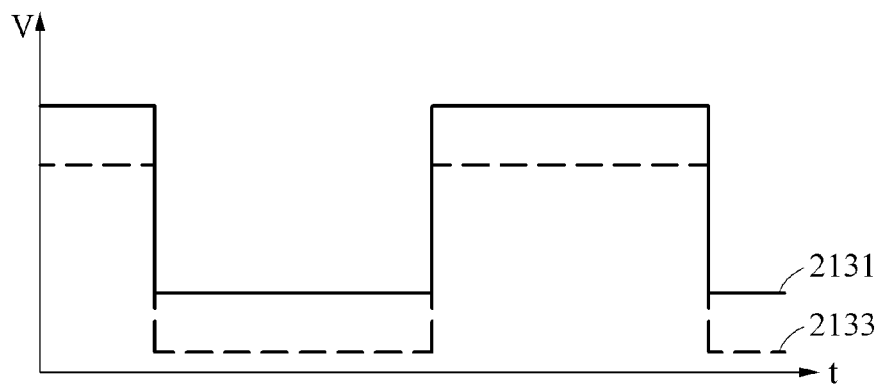

FIG. 22
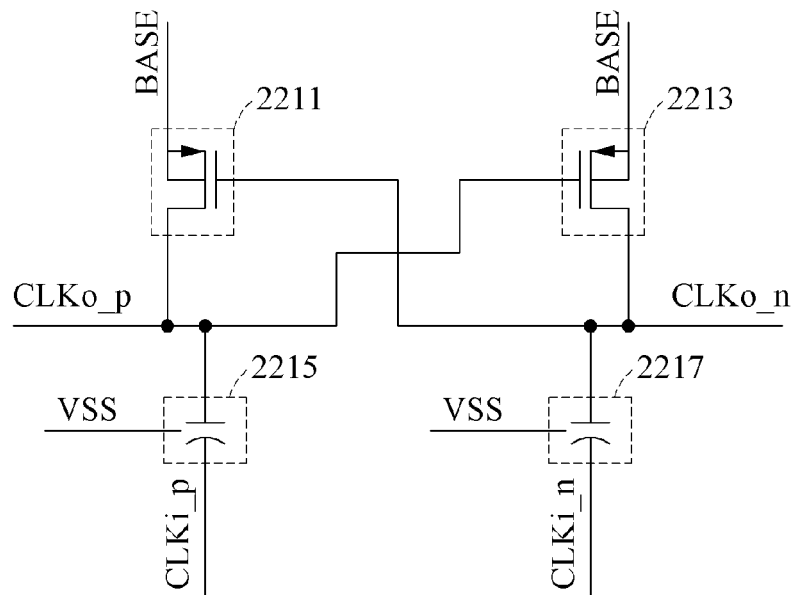
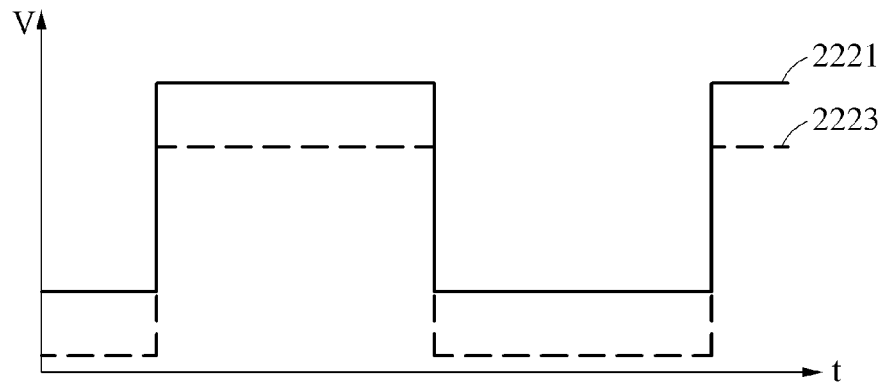
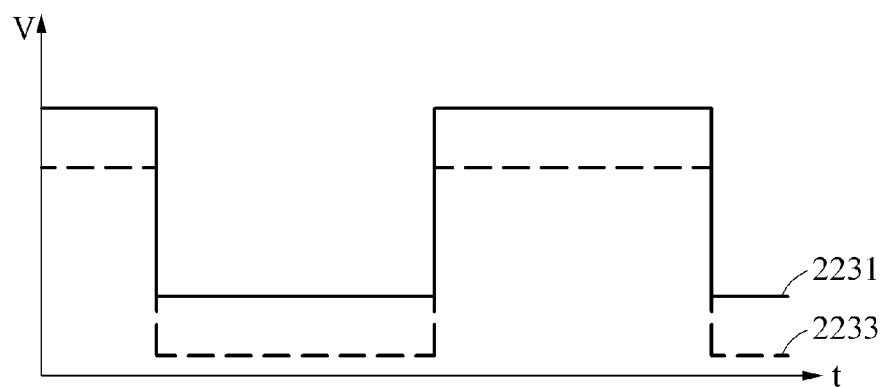

FIG. 23
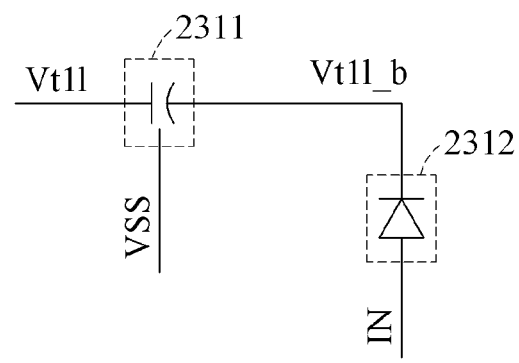
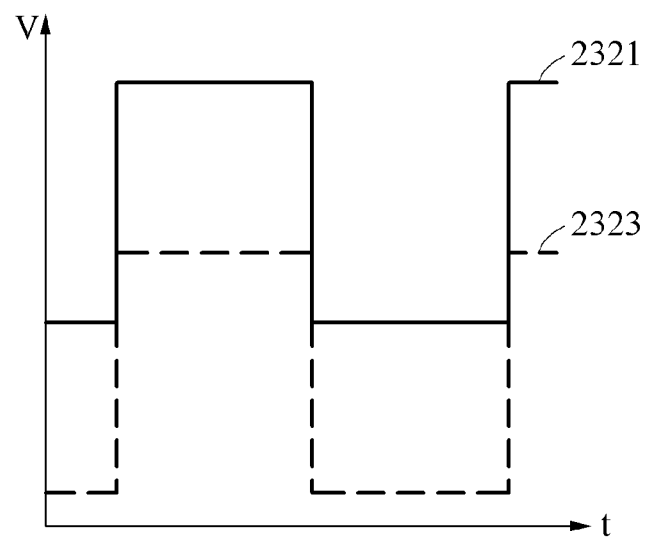

FIG. 24
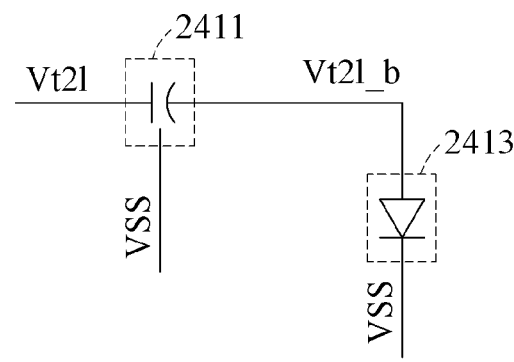
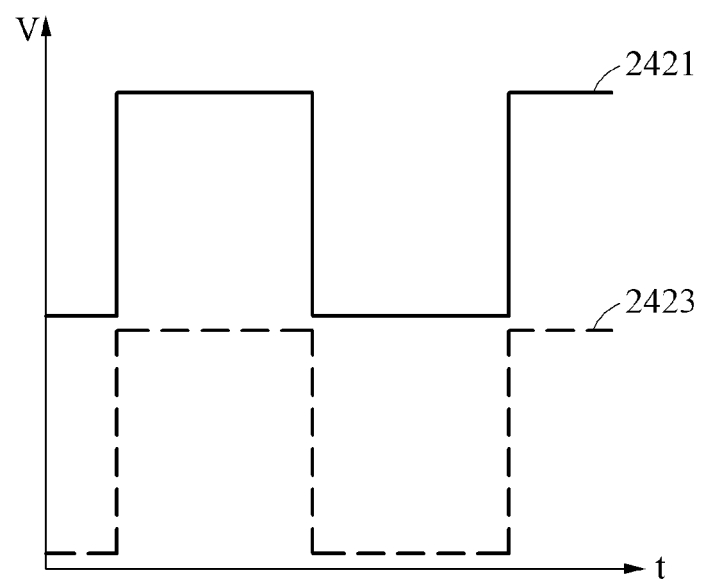

2500

TEMPERATURE SENSOR AND METHOD OF SENSING TEMPERATURE

CROSS-REFERENCE TO RELATED APPLICATION(S)

This application claims the benefit under 35 USC § 119(a) of Korean Patent Application No. 10-2017-0026488, filed on Feb. 28, 2017, in the Korean Intellectual Property Office, the entire disclosure of which is incorporated herein by reference for all purposes.

BACKGROUND

1. Field

The following description relates to a temperature sensor and a method of sensing a temperature.

2. Description of Related Art

Common materials or electronic devices can be used as temperature sensors because their electrical characteristics change with temperature. A detectable temperature range, a detection accuracy, a temperature characteristic, a possibility for mass production and a reliability may be determined based on a characteristic of a detection component used in a temperature sensor or a configuration of the temperature sensor. In a temperature measurement process, a detected signal output by a detection component of a temperature sensor, and a clock signal output by a clock generation component of the temperature sensor may have nonlinearity with respect to a temperature. For example, nonlinearity of each of the detected signal and the clock signal may have an influence on the detection accuracy and reliability. Thus, there is a desire to suppress such nonlinearities and to enhance a detection accuracy and reliability.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a temperature sensor including a temperature clock generator configured to generate a temperature clock signal based on a control signal to adjust a nonlinearity of the temperature clock signal, a reference clock generator configured to generate a reference clock signal, and a counter circuit configured to output a count signal by counting clocks of the temperature clock signal corresponding to a counting interval of the reference clock signal.

The temperature clock generator may include a nonlinearity adjustment circuit configured to control a device with a nonlinear value based on the control signal, and to adjust a nonlinearity of the temperature clock signal.

The nonlinearity adjustment circuit may include resistors with nonlinear resistance values, and a switch circuit configured to control a connection between the resistors based on the control signal.

The temperature may include a reference voltage generator configured to generate a threshold voltage used to generate the temperature clock signal and the reference clock signal, and to supply the threshold voltage to the temperature clock generator and the reference clock generator.

The reference voltage generator may include an amplifier configured to equalize a voltage of a first input node to a voltage of a second input node, and a threshold voltage generator configured to generate the threshold voltage based on a voltage applied to an output node of the amplifier.

An operating state of the reference voltage generator may be switched from an initial state to a settled state based on a settled signal generated by the reference clock signal.

The reference clock generator may include a capacitor, a switch circuit configured to charge the capacitor or discharge an electric charge of the capacitor based on a reference bias current, a comparator configured to output a comparison result obtained by comparing a first threshold voltage and a second threshold voltage based on a voltage stored in the capacitor, and a logic configured to output the reference clock signal based on the comparison result output by the comparator.

The temperature clock generator may include a temperature current conversion circuit configured to generate a temperature bias signal used to determine a frequency of the temperature clock signal, and a clock generation circuit configured to generate the temperature clock signal based on the temperature bias signal and a threshold voltage.

The temperature current conversion circuit may include an amplifier configured to equalize a first voltage of a first input node to a second voltage of a second input node, a first nonlinearity adjustment circuit connected to the first input node and configured to adjust the nonlinearity of the temperature clock signal based on the control signal, a second nonlinearity adjustment circuit connected to the second input node and configured to adjust the nonlinearity of the temperature clock signal based on the control signal, and a bias current generator configured to generate the temperature bias signal based on a voltage applied to an output node of the amplifier.

The first nonlinearity adjustment circuit may be configured to adjust the nonlinearity of the temperature clock signal in a first direction, and the second nonlinearity adjustment circuit may be configured to adjust the nonlinearity of the temperature clock signal in a second direction.

The clock generation circuit may include a capacitor, a switch circuit configured to charge the capacitor or discharge an electric charge of the capacitor based on the temperature bias signal, a comparator configured to output a comparison result obtained by comparing a first threshold voltage and a second threshold voltage based on a voltage stored in the capacitor, and a logic configured to output the temperature clock signal based on the comparison result output by the comparator.

In another general aspect, there is provided electronic device including a temperature sensor configured to generate a temperature clock signal based on a control signal and to generate a count signal by counting clocks of the temperature clock signal corresponding to a counting interval of a reference clock signal, and a controller configured to determine a nonlinear error of the count signal based on count values of the count signal measured at a plurality of temperatures, and to adjust a nonlinearity of the temperature clock signal to reduce the nonlinear error.

The controller may be configured to determine a linear expected value corresponding to a second temperature based on a first count value of the count signal measured at a first temperature and a third count value of the count signal measured at a third temperature, and to generate the control signal to reduce a difference between the linear expected value and a second count value of the count signal measured at the second temperature.

The temperature sensor may include a nonlinearity adjustment circuit configured to control a device with a nonlinear value based on the control signal and to adjust the nonlinearity of the temperature clock signal.

The nonlinearity adjustment circuit may include resistors with nonlinear resistance values, and a switch circuit configured to control a connection between the resistors based on the control signal.

The temperature sensor may include a first nonlinearity adjustment circuit configured to adjust the nonlinearity of the temperature clock signal in a first direction based on the control signal, and a second nonlinearity adjustment circuit configured to adjust the nonlinearity of the temperature clock signal in a second direction based on the control signal.

The controller may be configured to control one of the first nonlinearity adjustment circuit or the second nonlinearity adjustment circuit based on the nonlinear error of the count signal.

In another general aspect, there is provided a method of sensing a temperature, the method including receiving a control signal to adjust a nonlinearity of a temperature clock signal, generating the temperature clock signal based on the control signal, and outputting a count signal by counting clocks of the temperature clock signal corresponding to a counting interval of a reference clock signal.

The generating of the temperature clock signal may include controlling a device with a nonlinear value based on the control signal, and adjusting the nonlinearity of the temperature clock signal.

In another general aspect, there is provided a digital device including a controller configured to initialize a parameter corresponding to a number of times a nonlinearity is controlled based on a control signal, acquire a count signal from a temperature sensor, determine a nonlinear error based on the count signal, compare the nonlinear error to a first threshold based on a desired accuracy of temperature measurement, determining an amount of nonlinearity adjustment based on the nonlinear error, in response to the nonlinear error being greater than the first threshold and the parameter being lesser than a second threshold, and output a control signal to adjust the nonlinear error.

A value of the first threshold may be inversely proportional to a level of desired accuracy.

The count signal may be based on the measured temperature among temperatures.

Other features and aspects will be apparent from the following detailed description, the drawings, and the claims.

BRIEF DESCRIPTION OF THE DRAWINGS

FIGS. 2A and 2B illustrate examples of a calibration process.
FIGS. 17 through 24 illustrate examples of a control clock generation circuit of a second threshold voltage generation circuit.

Figure 1:
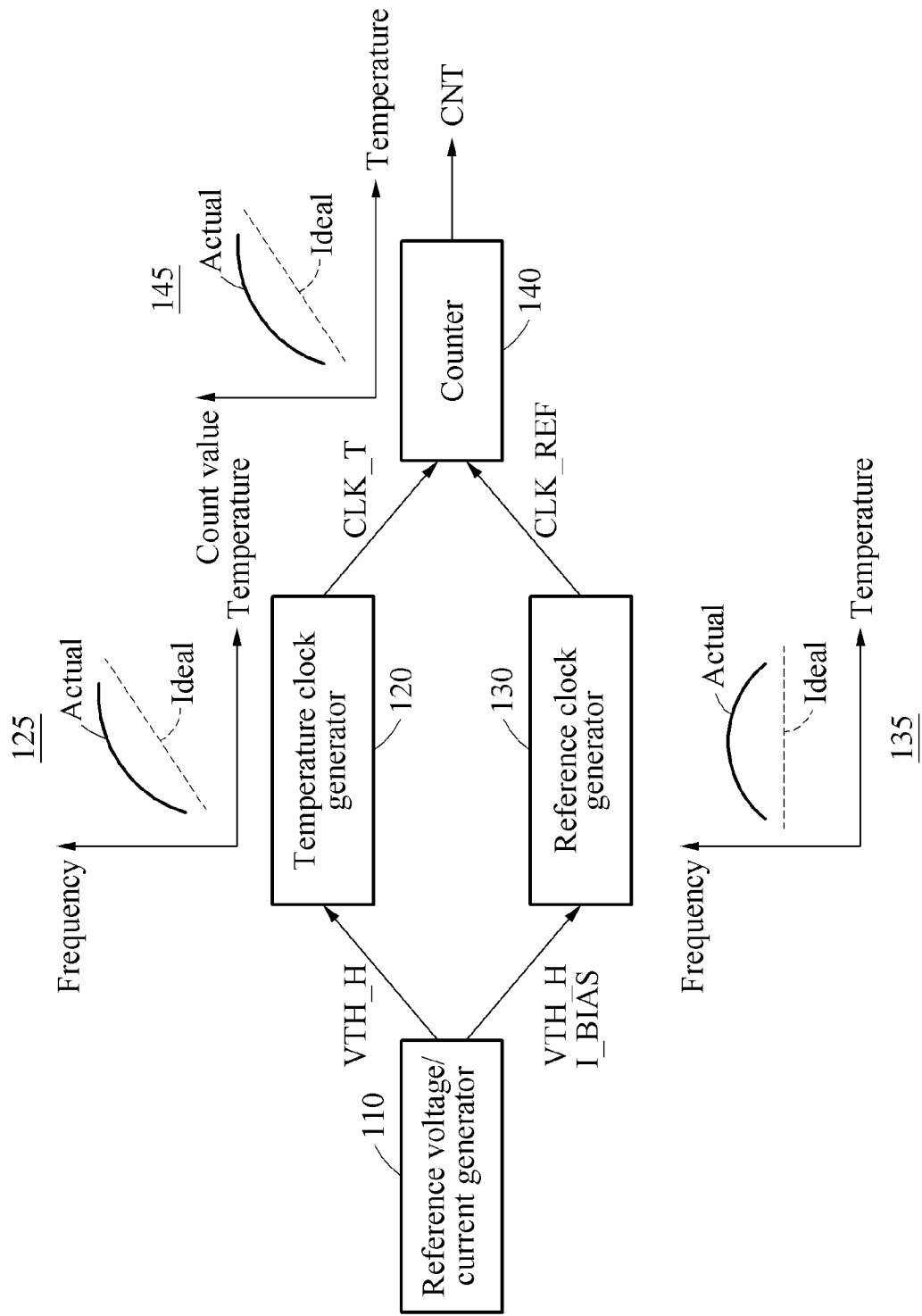
FIG. 1 illustrates an example of a temperature sensor.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following structural or functional descriptions of examples disclosed in the present disclosure are merely intended for the purpose of describing the examples and the examples may be implemented in various forms. The examples are not meant to be limited, but it is intended that various modifications, equivalents, and alternatives are also covered within the scope of the claims.

Although terms of "first," "second," etc. are used to explain various components, the components are not limited to such terms. These terms are used only to distinguish one component from another component. For example, a first component may be referred to as a second component, or similarly, the second component may be referred to as the first component within the scope of the right according to the concept of the present disclosure.

As used herein, the singular forms are intended to include the plural forms as well, unless the context clearly indicates otherwise.

FIG. 1 illustrates an example of a temperature sensor. Referring to FIG. 1, the temperature sensor includes a reference voltage and/or current (voltage/current) generator 110, a temperature clock generator 120, a reference clock generator 130 and a counter 140.

In an example, the reference voltage/current generator 110 generates a threshold voltage VTH_H and a reference bias current I_BIAS. The reference voltage/current generator 110 supplies the threshold voltage VTH_H to the temperature clock generator 120 and the reference clock generator 130, and supplies the reference bias current I_BIAS to the reference clock generator 130.

In an example, the reference clock generator 130 generates a reference clock signal CLK_REF based on the threshold voltage VTH_H and the reference bias current I_BIAS. In an example, the temperature clock generator 120 measures a temperature of a measurement target, and generates a temperature bias signal corresponding to the measured temperature. In an example, the temperature clock generator 120 generates a temperature clock signal CLK_T based on the threshold voltage VTH_H and the temperature bias signal.

In an example, the counter 140 outputs a count signal CNT based on the temperature clock signal CLK_T and the reference clock signal CLK_REF. In an example, the counter 140 counts clocks of the temperature clock signal CLK_T corresponding to a counting interval of the reference clock signal CLK_REF, and outputs the count signal CNT. The counting interval is determined based on a cycle of the reference clock signal CLK_REF. For example, the counter 140 outputs the count signal CNT by counting clocks of the temperature clock signal CLK_T during a single cycle of the reference clock signal CLK_REF.

A graph 125 shows a frequency of the temperature clock signal CLK_T based on a temperature, and a graph 135 shows a frequency of the reference clock signal CLK_REF based on a temperature. A graph 145 shows a count value of the count signal CNT based on a temperature.

Ideally, the frequency of the temperature clock signal CLK_T is linearly related to the temperature, and the frequency of the reference clock signal CLK_REF remains unchanged regardless of the temperature. Also, the count value of the count signal CNT is linearly related to the temperature. Accordingly, the temperature of the measurement target may be accurately measured based on the count value of the count signal CNT.

Actually, the frequency of the temperature clock signal CLK_T is nonlinearly related to the temperature, and the frequency of the reference clock signal CLK_REF changes nonlinearly based on the temperature. Also, the count value of the count signal CNT is nonlinearly related to the temperature. Accordingly, to measure the temperature of the measurement target based on the count signal CNT, calibration of the count signal CNT is performed. A complexity of the above calibration process increases as a nonlinearity of the count signal CNT increases.

Depending on examples, the temperature sensor adjusts a temperature-related nonlinearity of the temperature clock signal CLK_T, and calibrates the count signal CNT. The temperature clock generator 120 adjusts the temperature-related nonlinearity of the temperature clock signal CLK_T based on a control signal. The control signal is transmitted by, for example, a controller that is included in or separated from the temperature sensor. The temperature clock generator 120 adjusts the temperature-related nonlinearity of the temperature clock signal CLK_T so that the count value of the count signal CNT is linearly related to the temperature. For example, when the temperature-related nonlinearity of the temperature clock signal CLK_T is adjusted to offset a temperature-related nonlinearity of the reference clock signal CLK_REF, the count value of the count signal CNT is linear with respect to the temperature. In this example, the temperature of the measurement target is accurately measured based on the count value of the count signal CNT.

In an example, the frequency of the reference clock signal CLK_REF is affected by at least one factor among the threshold voltage VTH_H, a second threshold voltage VTH_L generated based on the threshold voltage VTH_H, a capacity of a capacitor included in the reference clock generator 130 or the reference bias current I_BIAS. In an example, the frequency of the temperature clock signal CLK_T is affected by at least one factor among the threshold voltage VTH_H, the second threshold voltage VTH_L, a capacity of a capacitor included in the temperature clock generator 120 or a temperature bias signal, which will be further described below. Depending on examples, the count signal CNT is calibrated by controlling a factor that affects the frequency of the temperature clock signal CLK_T.

Figure 2B:
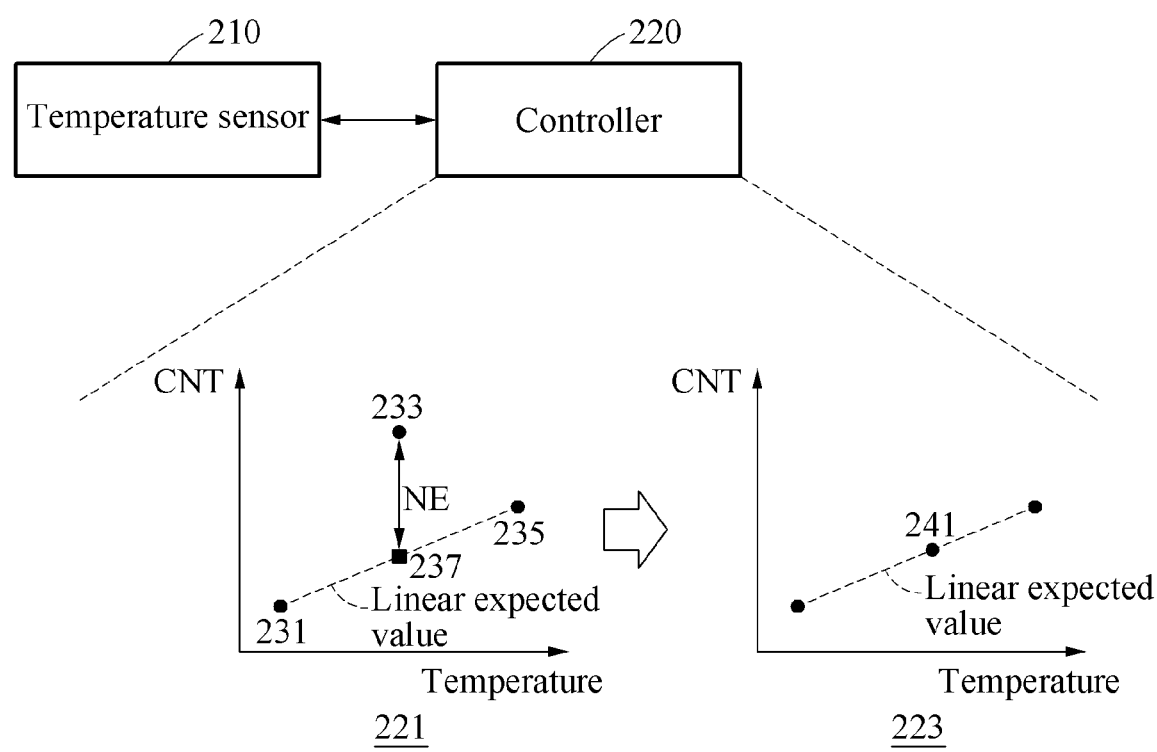

FIGS. 2A and 2B illustrate examples of a calibration process. Referring to FIG. 2A, a graph 211 shows an ideal example, a graph 213 shows an example in which a nonlinearity occurs in a reference clock signal CLK_REF due to a temperature change, and a graph 215 shows an example in which a nonlinearity of a temperature clock signal CLK_T is adjusted.

A temperature sensor 210 generates a count signal by counting clocks of the temperature clock signal CLK_T in a counting interval of the reference clock signal CLK_REF. For example, the temperature sensor 210 counts clocks of the temperature clock signal CLK_T corresponding to a single cycle of the reference clock signal CLK_REF. In this example, in the graph 211, a count value of the temperature clock signal CLK_T corresponding to a counting interval TR_1 is "2," a count value of the temperature clock signal CLK_T corresponding to a counting interval TR_2 is "3," and a count value of the temperature clock signal CLK_T corresponding to a counting interval TR_3 is "5."

A controller 220 determines a temperature of a measurement target based on the count signal. The controller 220 determines the temperature of the measurement target to be proportional to a count value of the count signal. For example, the controller 220 determines the temperature of the measurement target to be 2° C. based on a count value of "2," determines the temperature of the measurement target to be 3° C. based on a count value of "3," or determines the temperature of the measurement target to be 5° C. based on a count value of "5."

Based on a change in a temperature of a reference clock signal generator, a nonlinearity occurs in the reference clock signal CLK_REF. For example, in a region 214 of the graph 213, a nonlinearity occurs in the reference clock signal CLK_REF. Based on the change in the temperature of the reference clock signal generator, a counting interval TR1_2 corresponding to the counting interval TR_2 is reduced in comparison to the counting interval TR_2, and a counting interval TR1_3 corresponding to the counting interval TR_3 is reduced in comparison to the counting interval TR_3. Accordingly, a count value of the temperature clock signal CLK_T corresponding to the counting interval TR1_2 is changed to "2," and a count value of the temperature clock signal CLK_T corresponding to the counting interval TR1_3 is changed to "3." Thus, when the temperature of the measurement target is measured by a count signal generated based on the graph 213, an error occurs in the measured temperature.

The controller 220 reduces the error of the measured temperature by adjusting a nonlinearity of the temperature clock signal CLK_T of the temperature sensor 210 based on a control signal. For example, the controller 220 adjusts the nonlinearity of the temperature clock signal CLK_T so that the nonlinearity occurring in the reference clock signal CLK_REF is offset by the temperature clock signal CLK_T. Referring to the graph 215, the nonlinearity of the temperature clock signal CLK_T is adjusted in a region 216. When the nonlinearity of the temperature clock signal CLK_T is adjusted, a count value of the temperature clock signal CLK_T corresponding to a counting interval TR2_2 is restored to "3," and a count value of the temperature clock signal CLK_T corresponding to a counting interval TR2_3 is restored to "5." For example, when the temperature of the measurement target is measured by a count signal generated based on the graph 215, an error caused by the measured temperature is reduced.

Referring to FIG. 2B, a graph 221 shows an example in which a nonlinearity occurs in a count signal CNT, and a graph 223 shows an example in which the nonlinearity of the count signal CNT is calibrated.

A temperature sensor 210 of FIG. 2B outputs the count signal CNT by counting clocks of a temperature clock signal in a counting interval of a reference clock signal. A controller 220 of FIG. 2B determines a nonlinear error NE of the count signal CNT based on count values of the count signal CNT measured at a plurality of temperatures, and generates a control signal to adjust a nonlinearity of the temperature clock signal so that the nonlinear error NE of the count signal CNT is reduced.

The controller 220 determines points 231, 233 and 235 based on count values of the count signal CNT measured at a first temperature, a second temperature and a third temperature by the temperature sensor 210. The first temperature through the third temperature are set in advance for calibration of the temperature sensor 210. In an example, the first temperature is set to −55° C., the third temperature is set to 125° C., and the second temperature ranges from −55° C. to 125° C.

To increase the linearity of the count signal CNT, the point 233 needs to be located in a straight line that connects the points 231 and 235. The straight line is referred to as a "linear expected value." When the point 233 deviates from the linear expected value, the count signal CNT is determined to have the nonlinearity.

The controller 220 analyzes the nonlinearity of the count signal CNT based on the points 231, 233 and 235. For example, the controller 220 determines a linear expected value 237 corresponding to the second temperature from the linear expected value that connects the points 231 and 235, and determines a distance between the point 233 and the linear expected value 237 as a nonlinear error NE corresponding to the second temperature. As shown in the graph 221, when the count signal CNT has the nonlinearity, an error occurs in measurement of a temperature and a complex operation needs to be performed to reduce the error.

The controller 220 reduces the nonlinear error NE based on a control signal. For example, the controller 220 adjusts, based on the control signal, a nonlinearity of a temperature clock signal generated by a temperature clock generator, to reduce the nonlinear error NE.

The temperature clock generator includes a device with a nonlinear value, which will be further described below. The controller 220 controls the device based on the control signal, to gradually increase or decrease the nonlinearity of the temperature clock signal. In an example, the controller 220 controls the temperature clock generator to reduce the nonlinear error NE by repeating a process of measuring the count signal CNT at the second temperature and calculating the nonlinear error NE based on the count signal CNT.

The controller 220 controls the temperature clock generator so that the nonlinear error NE becomes less than a threshold. As shown in the graph 223, the nonlinearity of the count signal CNT is calibrated based on the control signal. Based on a control of the temperature clock generator, a point 241 close to the linear expected value is determined at the second temperature. Thus, it is possible to reduce the nonlinearity of the count signal CNT by controlling the temperature clock generator. As a result, an accuracy of temperature measurement is enhanced.

Figure 3:
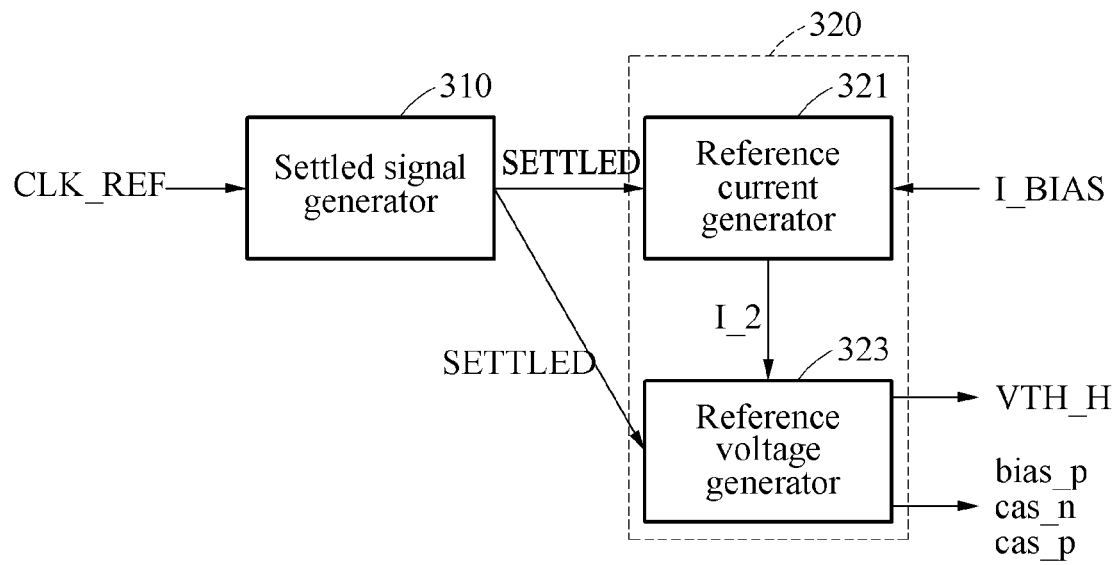
FIG. 3 illustrates an example of a settled signal generator and a reference voltage and/or current (voltage/current) generator.

FIG. 3 illustrates an example of a settled signal generator 310 and a reference voltage/current generator 320. Referring to FIG. 3, the settled signal generator 310 outputs a settled signal SETTLED based on a clock reference signal CLK_REF.

The reference voltage/current generator 320 includes a reference current generator 321 and a reference voltage generator 323. For example, the reference current generator 321 includes an amplifier 640 of FIG. 6, and the reference voltage generator 323 includes an amplifier 1030 of FIG. 10, which will be further described below. The amplifiers 640 and 1030 operate in two operating modes based on the settled signal SETTLED output from the settled signal generator 310. In an example, when the settled signal SETTLED is logically low, signals output from the amplifiers 640 and 1030 are used as bias signals needed in the amplifiers 640 and 1030. In another example, when the settled signal SETTLED is logically high, current signals received externally to the amplifiers 640 and 1030 are used as bias signals needed in the amplifiers 640 and 1030. The signals output from the amplifiers 640 and 1030 are output signals OUT of FIGS. 8 and 9, and the current signals received externally to the amplifiers 640 and 1030 correspond to an operating current I_1 of FIG. 9, which will be further described below. For example, based on the settled signal SETTLED, either the operating current I_1 or the output signals OUT is supplied as a driving bias to the amplifiers 640 and 1030, which will be further described with reference to FIG. 9.

The two operating modes are used to temporarily utilize outputs of the amplifiers 640 and 1030 because an accurate reference current needed by the amplifiers 640 and 1030 is not generated during an initial operation of a temperature sensor, and are used to operate the amplifiers 640 and 1030 at a low power when the settled signal SETTLED is logically high. Analog buffering is selectively performed on a threshold voltage VTH_H generated by the reference voltage generator 323. The reference voltage generator 323 generates bias signals bias_p, cas_n, and cas_p used for the analog buffering as needed.

In the following description, a direction of an arrow representing a current indicates whether the current corresponds to a sinking current or a sourcing current. In FIG. 3, an arrow representing a reference bias current I_BIAS indicates that the reference current generator 321 sinks the reference bias current I_BIAS.

When a clock reference signal CLK_REF is generated normally, the settled signal generator 310 generates the settled signal SETTLED based on the clock reference signal CLK_REF. The settled signal SETTLED is used for a low power operation of the temperature sensor. The temperature sensor operates in an initial state or a settled state. An operating state of the temperature sensor is switched based on the settled signal SETTLED.

For example, an operating state of each of the reference current generator 321 and the reference voltage generator 323 is switched from an initial state to a settled state based on the settled signal SETTLED. Bias settings of an amplifier included in the reference current generator 321 and an amplifier included in the reference voltage generator 323 are switched. When the settled signal SETTLED is not applied, the reference current generator 321 and the reference voltage generator 323 operate using a separate power source in the initial state. When the settled signal SETTLED is applied, the reference current generator 321 and the reference voltage generator 323 operate based on an operating current I_2 in the settled state.

Figure 4:
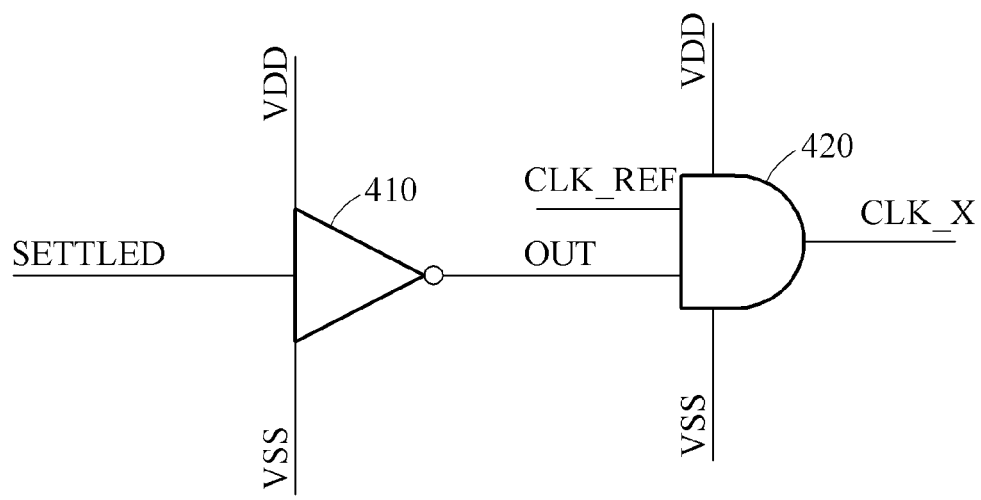
FIG. 4 illustrates an example of a clock signal generation part of a settled signal generator.

FIG. 4 illustrates an example of a clock signal generation part of a settled signal generator. Referring to FIG. 4, the clock signal generation part includes an inverter 410 and an AND gate 420. Each of the inverter 410 and the AND gate 420 operates based on voltages VSS and VDD.

The inverter 410 receives, as an input, a settled signal SETTLED and outputs a signal inverted from the settled signal SETTLED to an output node OUT. The AND gate 420 receives, as inputs, a clock reference signal CLK_REF and an output of the inverter 410, and outputs a clock signal CLK_X based on a logical operation.

For example, in an initial state, the settled signal SETTLED has a value of "0." In the following description, a signal with a value of "0" indicates a logical low level, and a signal with a value of "1" indicates a logical high level. When the settled signal SETTLED has a value of "0," the AND gate 420 outputs the clock reference signal CLK_REF as the clock signal CLK_X. When the settled signal SETTLED has a value of "1," the AND gate 420 outputs "0" as the clock signal CLK_X.

Figure 5:
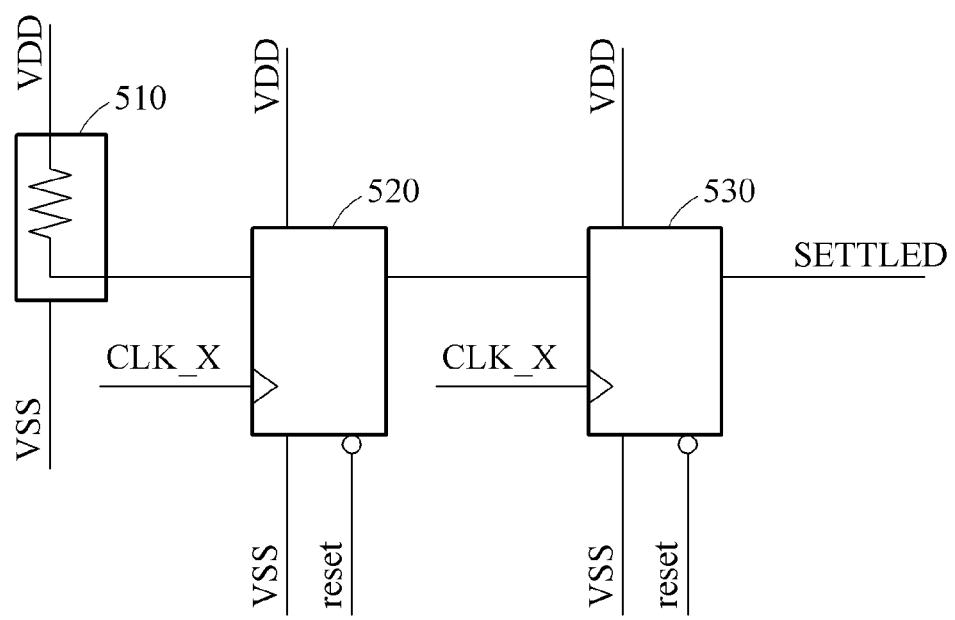
FIG. 5 illustrates an example of a settled signal generation part of a settled signal generator.

FIG. 5 illustrates an example of a settled signal generation part of a settled signal generator. Referring to FIG. 5, the settled signal generation part includes a TIEH cell 510 and flip-flops 520 and 530.

A logically high signal is applied to the TIEH cell 510. The TIEH cell 510 prevents an input gate of the flip-flop 520 from being damaged when a voltage VDD increases instantly. The flip-flops 520 and 530 are reset by reset signals "reset." When a first rising edge occurs in a clock signal CLK_X, a logical high voltage is output from the flip-flop 520. When a second rising edge occurs in the clock signal CLK_X, a logically high settled signal SETTLED is output from the flip-flop 530. Accordingly, in the example of FIG. 5, when two rising edges occur in the clock signal CLK_X, the settled signal generation part outputs a logically high signal as the settled signal SETTLED. The example of FIG. 5 is merely an example, and accordingly the settled signal SETTLED is implemented to be logically high when an n-th rising edge occurs in the clock signal CLK_X.

In FIG. 4, when the settled signal SETTLED has the value of "0," the clock signal CLK_X corresponds to the clock reference signal CLK_REF. Thus, when two rising edges occur in the clock reference signal CLK_REF, the settled signal SETTLED is logically high. Although two flip-flops are used in the example of FIG. 5, this is merely an example, and other examples, such as, a single flip-flop or at least three flip-flops may be used.

Figure 6:
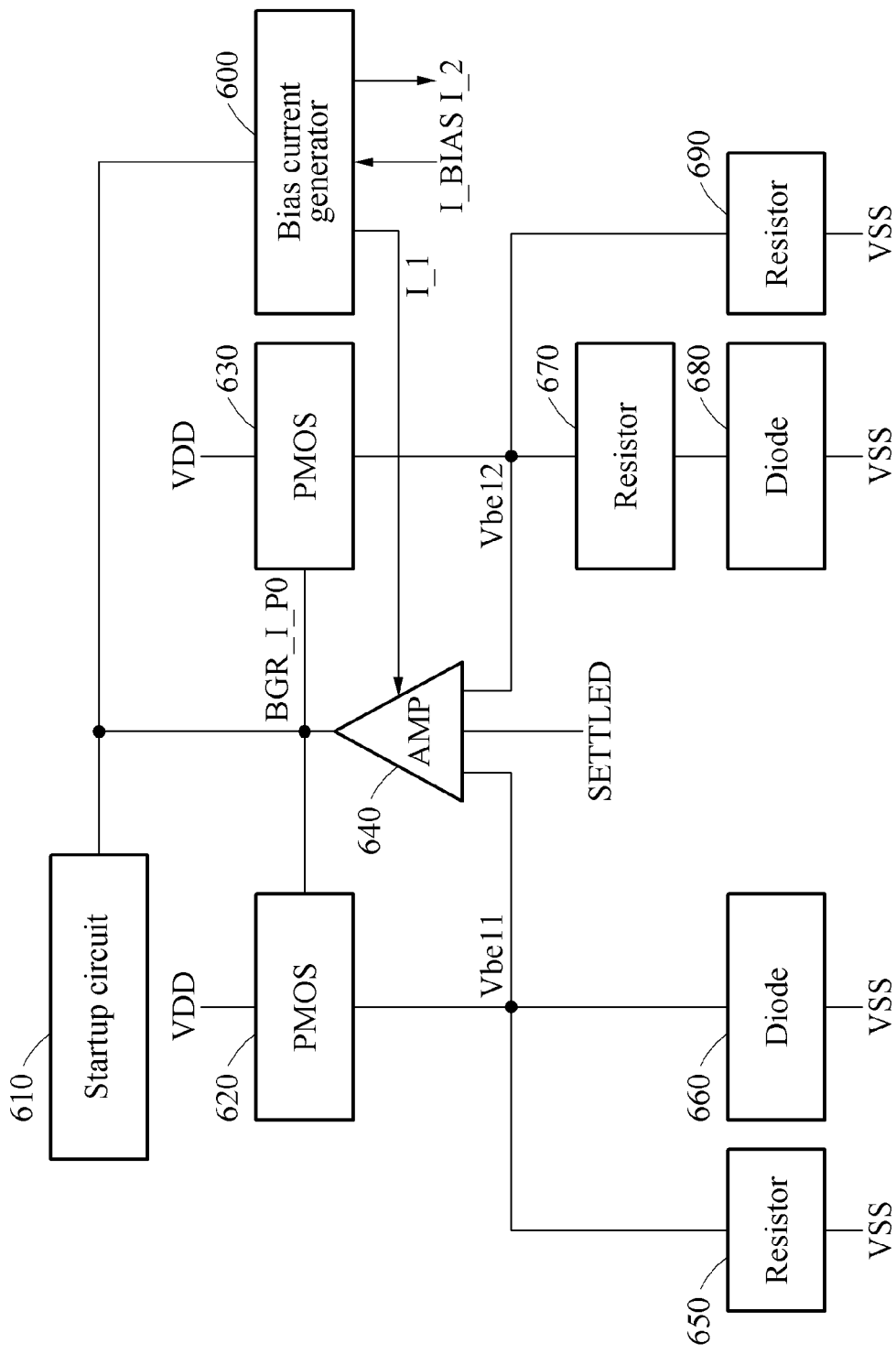
FIG. 6 illustrates an example of a reference current generator.

FIG. 6 illustrates an example of a reference current generator. Referring to FIG. 6, a startup circuit 610 prevents a voltage BGR_I_P0 applied to an output node of the amplifier 640 from being out of a normal range. For a stable operation of the reference current generator, the voltage BGR_I_P0 needs to be adjusted to be within a range. The startup circuit 610 adjusts the voltage BGR_I_P0 to be within the range. An example of the startup circuit 610 will be further described with reference to FIG. 7.

Figure 7:
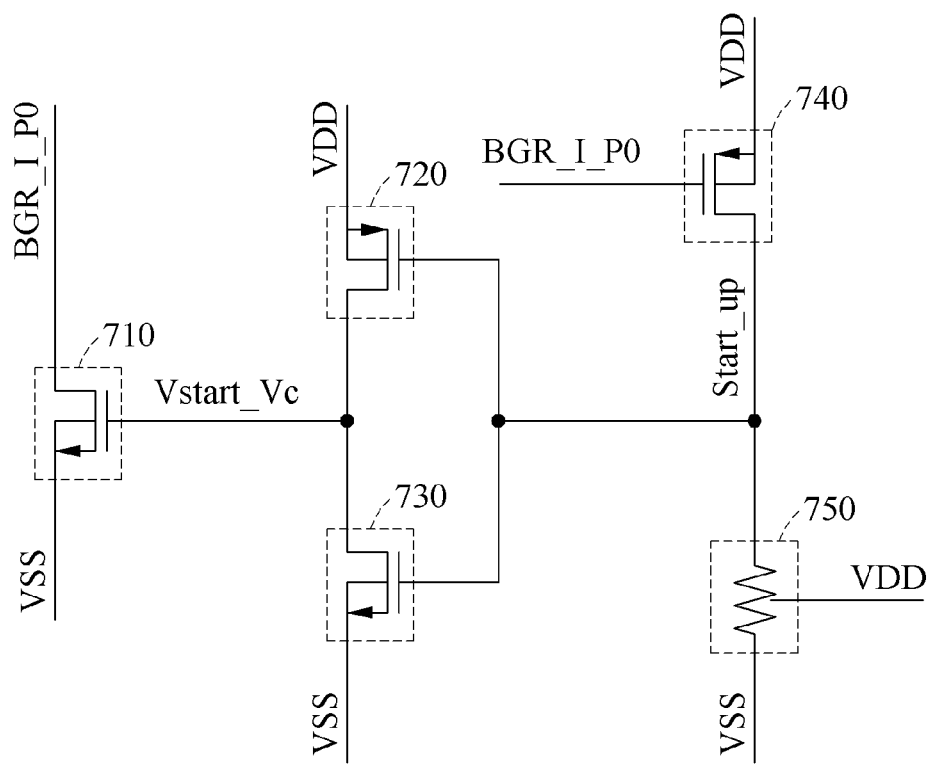
FIG. 7 illustrates an example of a startup circuit of a reference current generator.

FIG. 7 illustrates an example of a startup circuit of a reference current generator. Referring to FIG. 7, the startup circuit includes transistors 710, 720, 730 and 740, and a resistor 750. The startup circuit adjusts a voltage BGR_I_P0 to be within a range using the transistors 710 through 740 and the resistor 750.

In an example, when the voltage BGR_I_P0 is a voltage VDD, a voltage VSS is applied to a node Start_up and the voltage VDD is applied to a node Vstart_Vc. In this example, the voltage BGR_I_P0 drops due to operations of the transistors 710 through 740. In another example, when the voltage BGR_I_P0 is the voltage VSS, the voltage VDD is applied to the node Start_up and the voltage VSS is applied to the node Vstart_Vc. In this example, the voltage BGR_I_P0 rises due to operations of the transistors 710 through 740. Thus, the voltage BGR_I_P0 is adjusted to be within a range between the voltages VDD and VSS.

Referring back to FIG. 6, a voltage Vbe11 is applied to a first input node of the amplifier 640 and a voltage Vbe12 is applied to a second input node of the amplifier 640. The voltage Vbe11 is formed by a P-channel metal-oxide-semiconductor (PMOS) transistor 620, a resistor 650 and a diode 660. The voltage Vbe12 is formed by a PMOS transistor 630, resistors 670 and 690 and a diode 680. For an accuracy of temperature measurement, a reference bias current I_BIAS needs to be insensitive to a temperature. To this end, the resistors 650, 670 and 690 are insensitive to the temperature.

The amplifier 640 equalizes the voltages Vbe11 and Vbe12. The amplifier 640 operates in an initial state or a settled state based on a settled signal SETTLED. For example, when the settled signal SETTLED has a value of "0," the amplifier 640 operates even though an external operating current I_1 is not supplied. When the settled signal SETTLED has a value of "1," the amplifier 640 operates based on the operating current I_1 in the settled state. An example of the amplifier 640 will be further described with reference to FIGS. 8 and 9.

Figure 8:
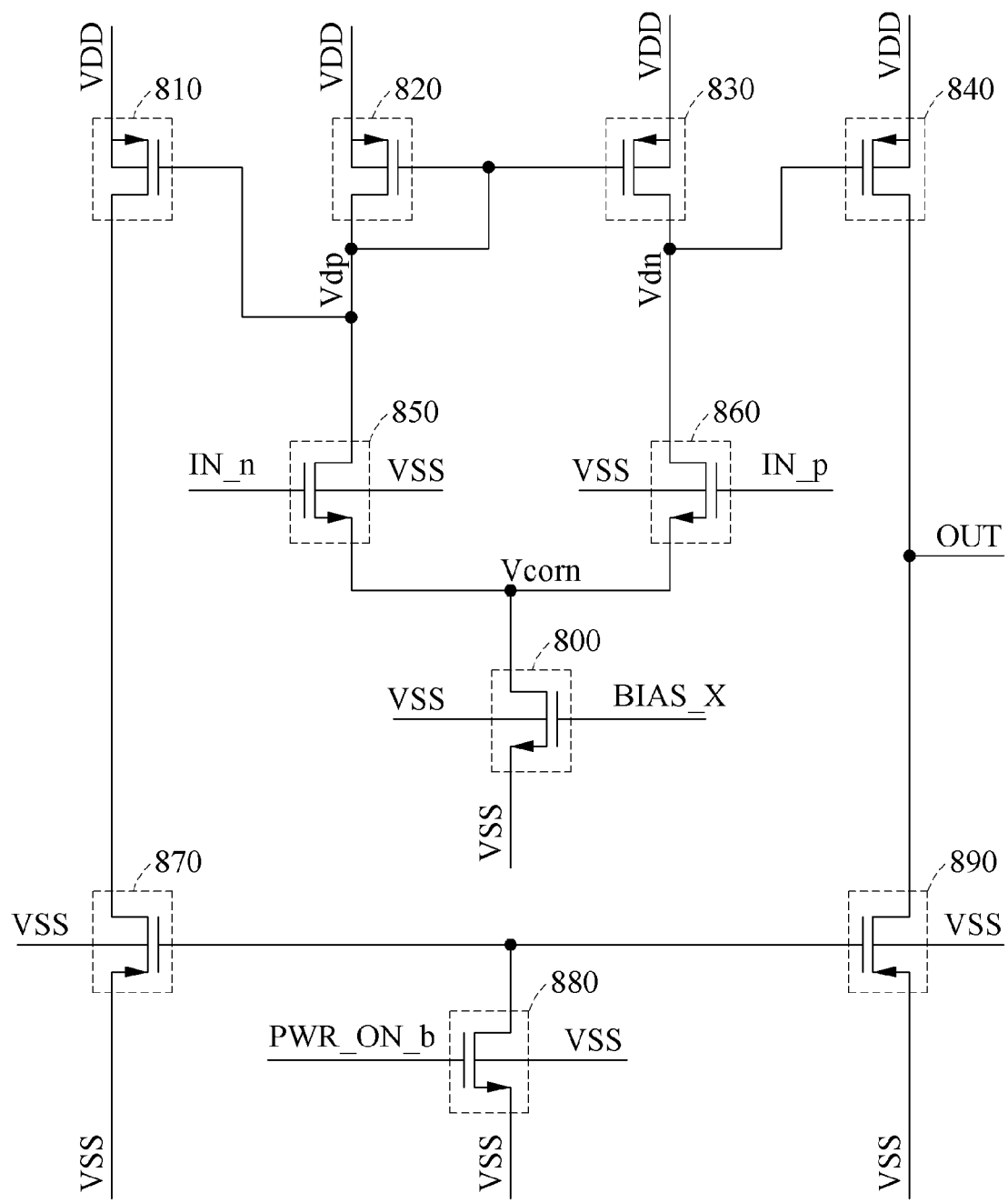
FIG. 8 illustrates an example of an amplifier of a reference current generator.
Figure 9:
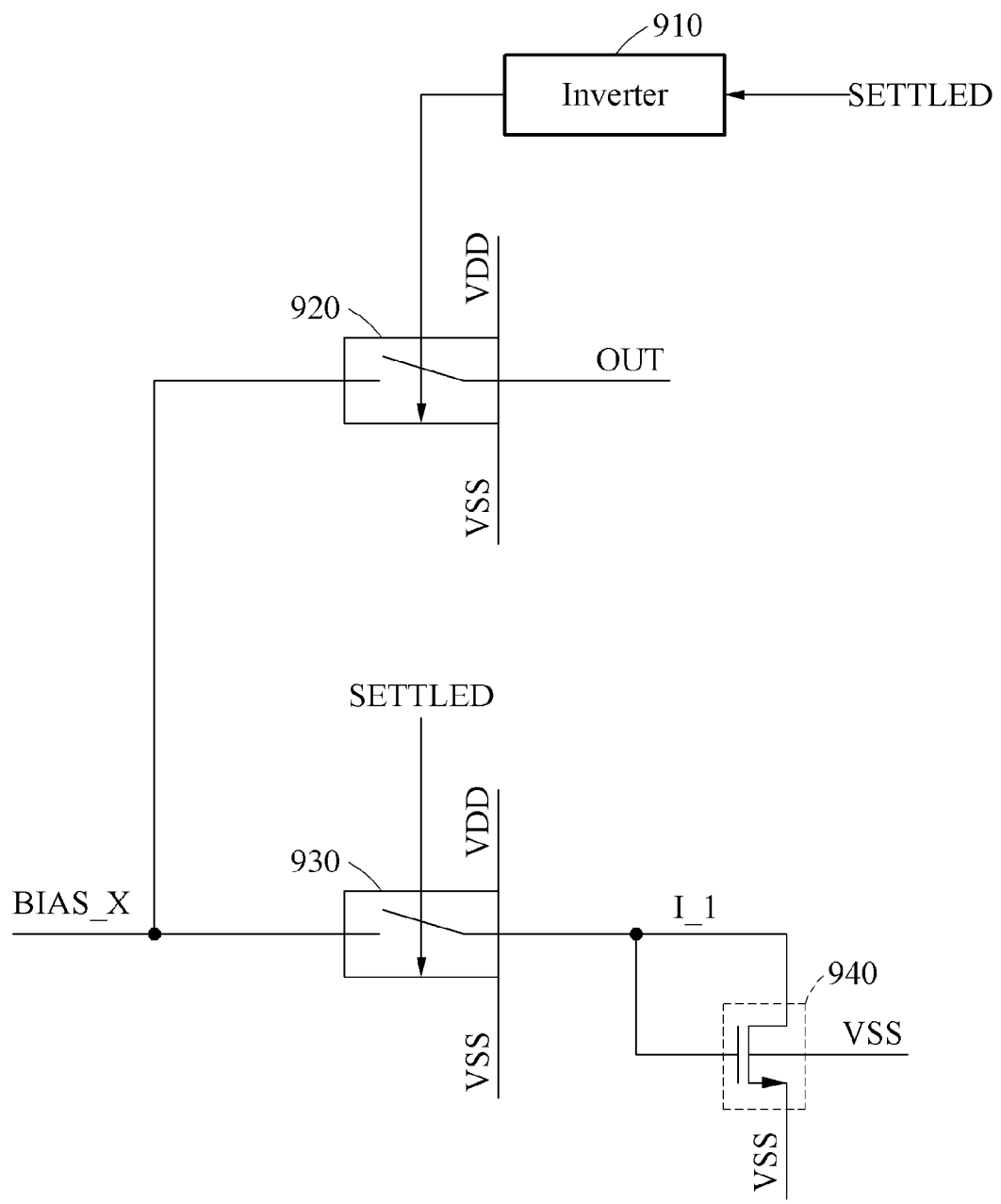
FIG. 9 illustrates an example of a driving bias supply circuit to supply a driving bias to an amplifier of a reference current generator.

FIG. 8 illustrates an example of an amplifier of a reference current generator. Referring to FIG. 8, the amplifier includes transistors 800, 810, 820, 830, 840, 850, 860, 870, 880 and 890. FIG. 9 illustrates an example of a driving bias supply circuit to supply a driving bias to an amplifier of a reference current generator. Referring to FIG. 9, the driving bias supply circuit includes an inverter 910, switches 920 and 930, and a transistor 940.

The driving bias supply circuit outputs a voltage BIAS_X based on a settled signal SETTLED, and the transistor 800 allows a current to flow based on the voltage BIAS_X. When the settled signal SETTLED has a value of "0," an output signal OUT is supplied by the switch 920 to a node to which the voltage BIAS_X is applied. When the settled signal SETTLED has a value of "1," an operating current I_1 is supplied to the node to which the voltage BIAS_X is applied, and a current that is proportional to the operating current I_1 is mirrored to the transistor 800.

The voltage BIAS_X is applied to a gate of the transistor 800. Also, the voltages Vbe11 and Vbe12 of FIG. 6 are applied to a node IN_n of the transistor 850 and a node IN_p of the transistor 860. A voltage PWR_ON_b is applied to a gate of the transistor 880. The transistor 800 allows a current to flow based on the voltage BIAS_X. The transistors 850 and 860 output voltages Vdp and Vdn based on the voltages Vbe11 and Vbe12. Accordingly, the amplifier equalizes the voltages Vbe11 and Vbe12. A voltage to equalize the voltages Vbe11 and Vbe12 is output to an output node OUT.

Referring back to FIG. 6, a bias current generator 600 outputs the reference bias current I_BIAS and operating currents I_1 and I_2 based on the voltage BGR_I_P0. The bias current generator 600 mirrors an input current at a ratio and outputs the reference bias current I_BIAS and operating currents I_1 and I_2. The bias current generator 600 sinks the reference bias current I_BIAS and sources the operating currents I_1 and I_2. In an example, the reference bias current I_BIAS is set to 5 nanoamperes (nA) and the operating currents I_1 and I_2 are set to 13 nA.

Figure 10:
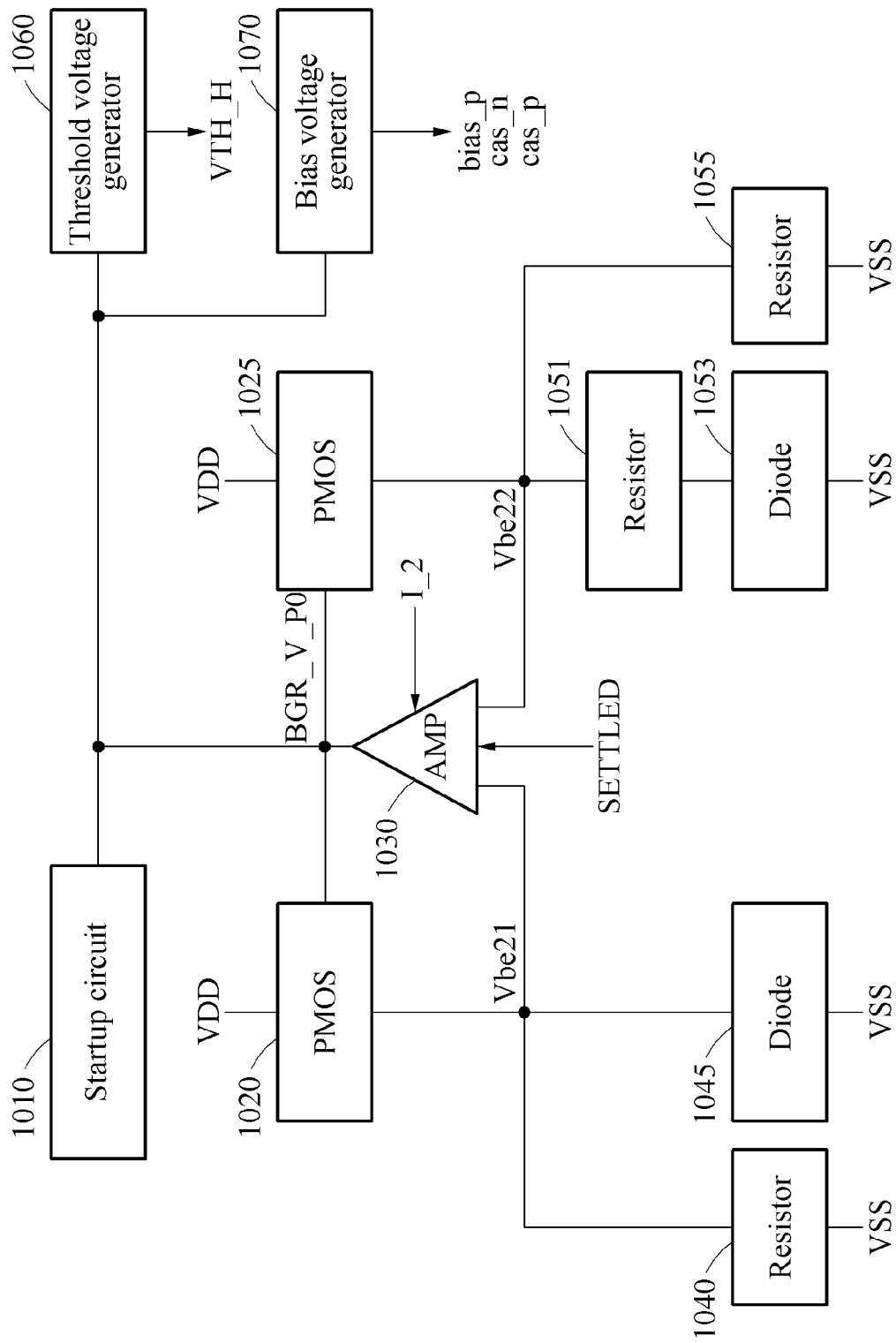
FIG. 10 illustrates an example of a reference voltage generator.

FIG. 10 illustrates an example of a reference voltage generator. Referring to FIG. 10, a startup circuit 1010 adjusts a voltage BGR_V_P0 applied to an output node of the amplifier 1030. For a stable operation of the reference voltage generator, the voltage BGR_V_P0 needs to be adjusted to be within a range. The startup circuit 1010 adjusts the voltage BGR_V_P0 to be within a range. The startup circuit 1010 will be further described with reference to FIG. 11.

Figure 11:
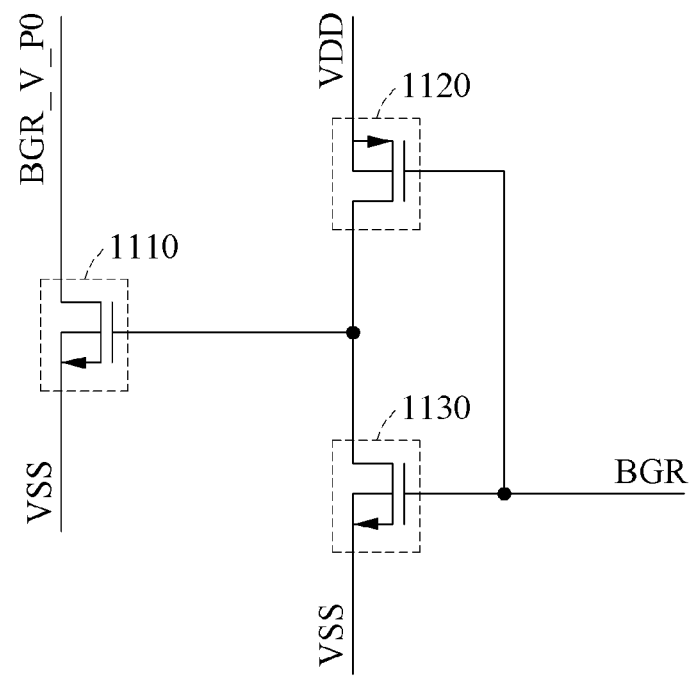
FIG. 11 illustrates an example of a startup circuit of a reference voltage generator

FIG. 11 illustrates an example of a startup circuit of a reference voltage generator. Referring to FIG. 11, the startup circuit includes transistors 1110, 1120 and 1130. The startup circuit adjusts a voltage BGR_V_P0 to be within a range using the transistors 1110 through 1130.

For example, a threshold voltage VTH_H output from a threshold voltage generator 1060 of FIG. 10 is applied to a node BGR. In an example, when the voltage BGR_V_P0 is a voltage VDD, the voltage VDD is applied to a gate of the transistor 1110. In this example, the voltage BGR_V_P0 drops due to operations of the transistors 1110 through 1130. In another example, when the voltage BGR_V_P0 is a voltage VSS, the voltage VSS is applied to the gate of the transistor 1110. In this example, the voltage BGR_V_P0 rises due to the operations of the transistors 1110 through 1130. Thus, the voltage BGR_V_P0 is adjusted to be within a range between the voltages VDD and VSS.

Referring back to FIG. 10, a voltage Vbe21 is applied to a first input node of the amplifier 1030, and a voltage Vbe22 is applied to a second input node of the amplifier 1030. The voltage Vbe21 is formed by a PMOS transistor 1020, a resistor 1040 and a diode 1045, and the voltage Vbe22 is formed by a PMOS transistor 1025, resistors 1051 and 1055 and a diode 1053. For an accuracy of temperature measurement, a threshold voltage VTH_H is insensitive to a temperature. To this end, the resistors 1040, 1051 and 1055 are insensitive to the temperature.

The amplifier 1030 equalizes the voltages Vbe21 and Vbe22. The amplifier 1030 operates in an initial state or a settled state based on a settled signal SETTLED. The description of the amplifier 640 of FIG. 6 is also applicable to the amplifier 1030, and are incorporated herein by reference. Thus, the above description is not repeated here.

The threshold voltage generator 1060 outputs the threshold voltage VTH_H based on the voltage BGR_V_P0, and a bias voltage generator 1070 outputs signals bias_p, cas_n and cas_p based on the voltage BGR_V_P0. An example of the threshold voltage generator 1060 will be described with reference to FIG. 12. The threshold voltage generator 1060 selectively uses an analog buffer to output the threshold voltage VTH_H, and the signals bias_p, cas_n and cas_p are bias signals used to operate the analog buffer.

Figure 12:
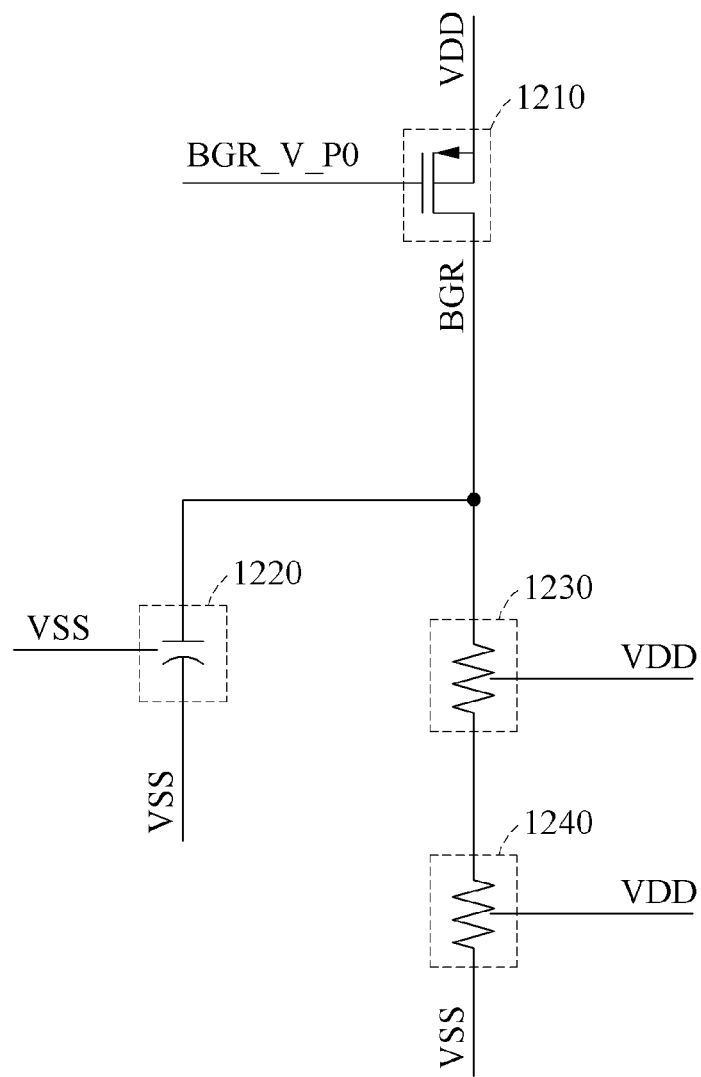
FIG. 12 illustrates an example of a threshold voltage generator.

FIG. 12 illustrates an example of a threshold voltage generator. Referring to FIG. 12, the threshold voltage generator includes a transistor 1210, a capacitor 1220 and resistors 1230 and 1240. A voltage BGR_V_P0 is applied to a gate of the transistor 1210. For example, a voltage VSS is applied to the capacitor 1220, and voltages VDD are applied to the resistors 1230 and 1240. In this example, the threshold voltage generator outputs a voltage applied to a node BGR. For an accuracy of a temperature measurement, a threshold voltage VTH_H needs to be insensitive to a temperature, and accordingly the threshold voltage generator outputs the threshold voltage VTH_H that is insensitive to the temperature, through the node BGR.

Figure 13:
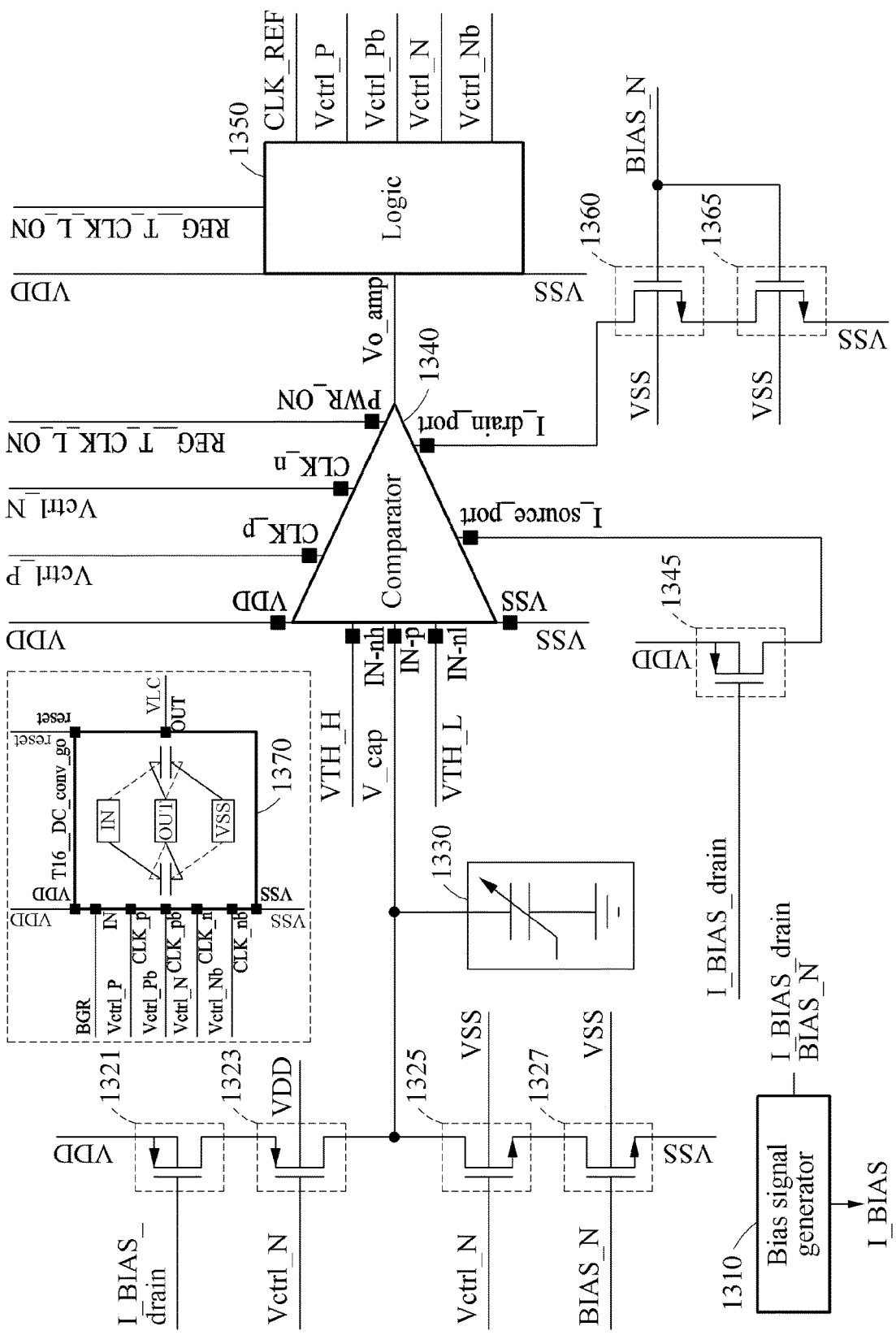
FIG. 13 illustrates an example of a reference clock generator.

FIG. 13 illustrates an example of a reference clock generator. Referring to FIG. 13, the reference clock generator includes a switch circuit, a capacitor 1330, a comparator 1340 and a logic 1350. The switch circuit includes transistors 1321, 1323, 1325 and 1327.

A bias signal generator 1310 outputs bias signals I_BIAS_drain and BIAS_N based on a reference bias current I_BIAS.

The switch circuit charges the capacitor 1330 or discharges an electric charge of the capacitor 1330 based on the bias signals I_BIAS_drain and BIAS_N. For example, the bias signal I_BIAS_drain is supplied to a gate of the transistor 1321, and the bias signal BIAS_N is supplied to a gate of the transistor 1327. Control signals Vctrl_N are supplied to the transistors 1323 and 1325. The control signal Vctrl_N is output from the logic 1350.

Currents flow in the transistors 1321 and 1323 by the bias signal I_BIAS_drain and the control signal Vctrl_N, and the capacitor 1330 is charged with an electric charge. Also, when the bias signal BIAS_N and the control signal Vctrl_N allow currents to flow in the transistors 1325 and 1327, the electric charge is discharged from the capacitor 1330.

The comparator 1340 compares a voltage V_cap formed based on the electric charge in the capacitor 1330 to a threshold voltage VTH_H and a second threshold voltage VTH_L. An operation of the comparator 1340 is described below. For example, when the voltage V_cap that is greater than the second threshold voltage VTH_L rises, the comparator 1340 compares the voltage V_cap to the threshold voltage VTH_H. In this example, when the voltage V_cap exceeds the threshold voltage VTH_H, a voltage Vo_amp is in a logical high state. Accordingly, the control signal Vctrl_N changes from a logical low level to a logical high level, and the electric charge in the capacitor 1330 is emitted to a node VSS via the transistors 1325 and 1327. Because the electric charge in the capacitor 1330 is emitted, the voltage V_cap continues to drop. Until the voltage V_cap reaches the second threshold voltage VTH_L, the voltage Vo_amp is maintained in the logical high state. When the voltage V_cap further drops to be less than the second threshold voltage VTH_L, the voltage Vo_amp is in a logical low state. Thus, the control signal Vctrl_N changes from the logical high level to the logical low level, and currents flowing through the transistors 1325 and 1327 are blocked. Currents flow through the transistors 1321 and 1323 to fill the capacitor 1330 with electric charges, and the voltage V_cap starts to rise again. An example of the comparator 1340 will be further described with reference to FIG. 14.

Figure 14:
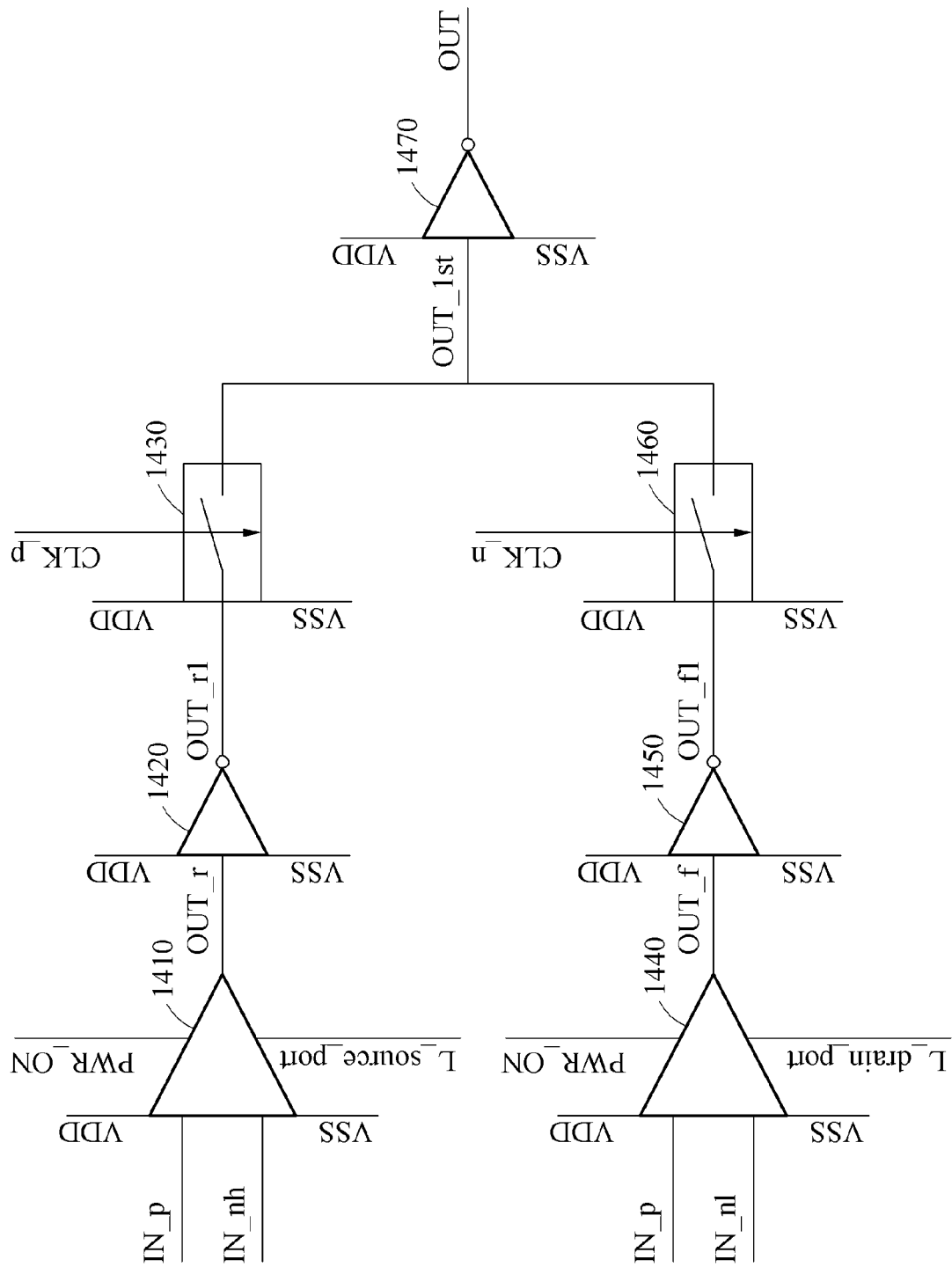
FIG. 14 illustrates an example of a comparator of a reference clock generator.

FIG. 14 illustrates an example of a comparator of a reference clock generator. Referring to FIGS. 13 and 14, ports of the comparator 1340 correspond to ports of sub-comparators 1410 and 1440. The voltage V_cap is applied to a port IN_p, the threshold voltage VTH_H is applied to a port IN_nh, and the second threshold voltage VTH_L is applied to a port IN_nl. Also, a control signal REG_T_CLK_L_ON is applied to a port PWR_ON, a current flowing in a transistor 1345 is applied to a port I_source_port, and currents flowing in transistors 1360 and 1365 are applied to a port I_drain_port. The control signal REG_T_CLK_L_ON is a signal to power on or off the sub-comparators 1410 and 1440, and currents used to operate the sub-comparators 1410 and 1440 are provided by the ports I_source_port and I_drain_port.

An inverter 1420 inverts a voltage OUT_r and outputs a voltage OUT_r1. An inverter 1450 inverts a voltage OUT_f and outputs a voltage OUT_f1. A control signal Vctrl_P is applied to a port CLK_p, and the control signal Vctrl_N is applied to a port CLK_n. Thus, switches 1430 and 1460 alternately connect the inverters 1420 and 1450 to an inverter 1470 based on the control signals Vctrl_P and Vctrl_N.

The voltages OUT_r1 and OUT_f1 are alternately applied to a node OUT_1st. The inverter 1470 outputs the voltage Vo_amp to an output node OUT based on a voltage that is input to the node OUT_1st. For example, when a voltage of the capacitor 1330 that is less than the threshold voltage VTH_H rises, a rising edge of the sub-comparator 1410 is output to the output node OUT. When the voltage of the capacitor 1330 that is greater than the second threshold voltage VTH_L drops, a falling edge of the sub-comparator 1440 is output to the output node OUT. To prevent outputs of the inverters 1420 and 1450 from being simultaneously supplied to the inverter 1470, the control signals Vctrl_P and Vctrl_N need to have a non-overlapping clock relationship.

Referring back to FIG. 13, the logic 1350 outputs a reference clock signal CLK_REF and control signals Vctrl_P, Vctrl_Pb, Vctrl_N and Vctrl_Nb based on the voltage Vo_amp. The logic 1350 is powered on or off based on the control signal REG_T_CLK_L_ON. An example of the logic 1350 will be described with reference to FIG. 15.

Figure 15:
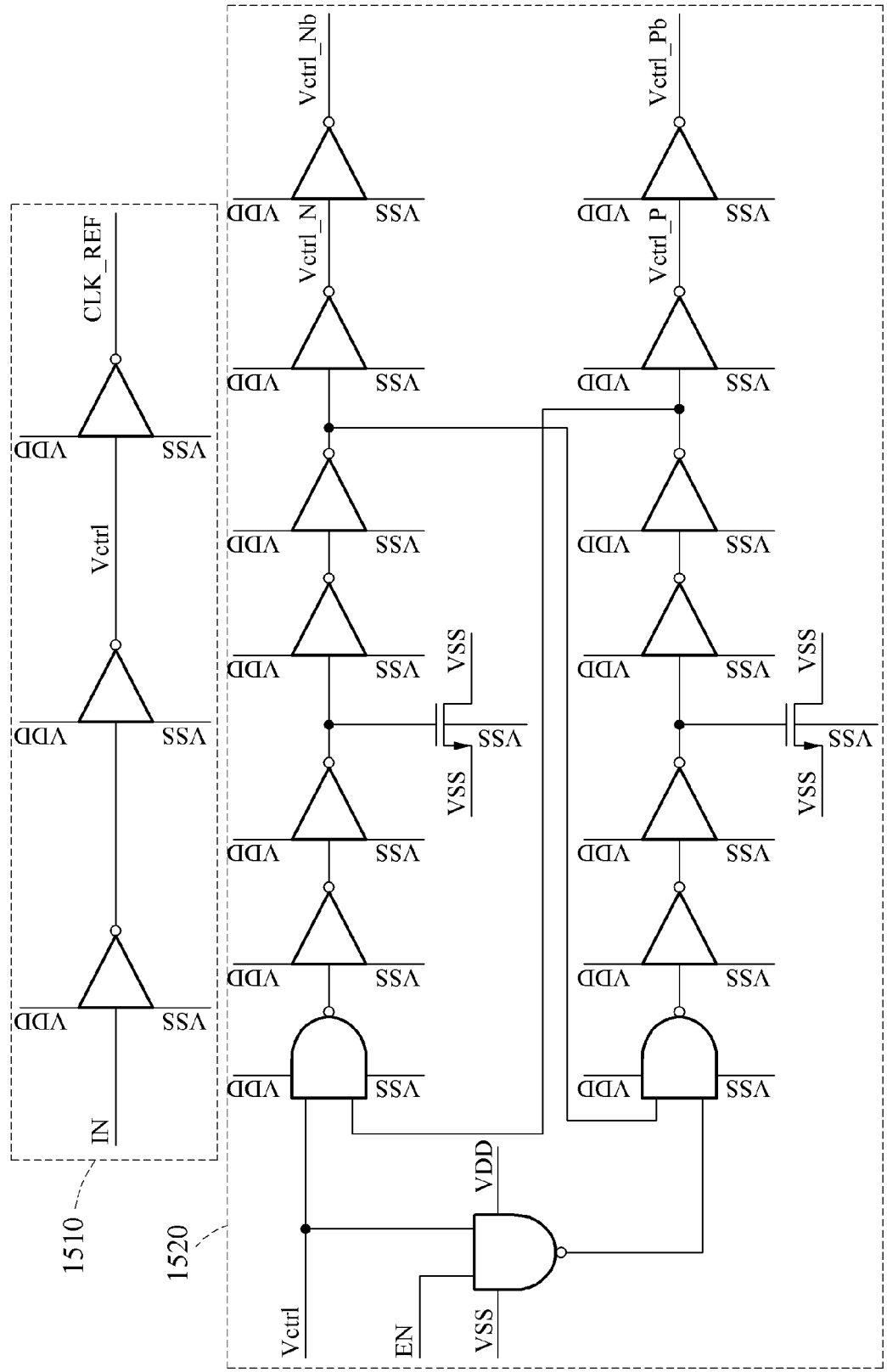
FIG. 15 illustrates an example of a logic of a reference clock generator.

FIG. 15 illustrates an example of a logic of a reference clock generator. Referring to FIGS. 13 and 15, a circuit 1510 receives the voltage Vo_amp through an input node IN. The circuit 1510 outputs a reference clock signal CLK_REF through inverters. A circuit 1520 receives a voltage applied to a node Vctrl of the circuit 1510. The circuit 1520 outputs control signals Vctrl_N, Vctrl_Nb, Vctrl_P and Vctrl_Pb through AND gates, transistors and inverters. Through the inverters included in the circuits 1510 and 1520, sharpness of the reference clock signal CLK_REF and the control signals Vctrl_N, Vctrl_Nb, Vctrl_P and Vctrl_Pb is enhanced. The control signals Vctrl_N and Vctrl_P have a non-overlapping relationship, which indicates that the control signals Vctrl_N and Vctrl_P are not in a logical high state at the same time. The control signal Vctrl_Nb is an inverted signal of the control signal Vctrl_N, and the control signal Vctrl_Pb is an inverted signal of the control signal Vctrl_P.

Referring back to FIG. 13, a second threshold voltage generation circuit 1370 generates the second threshold voltage VTH_L based on the threshold voltage VTH_H. The threshold voltage VTH_H is supplied by the threshold voltage generator 1060 of FIG. 10. An input signal BGR of the second threshold voltage generation circuit 1370 corresponds to the threshold voltage VTH_H. An example of the second threshold voltage generation circuit 1370 will be described with reference to FIGS. 16 through 24. Ports shown in FIGS. 17 through 20 correspond to ports of the second threshold voltage generation circuit 1370.

Figure 16:
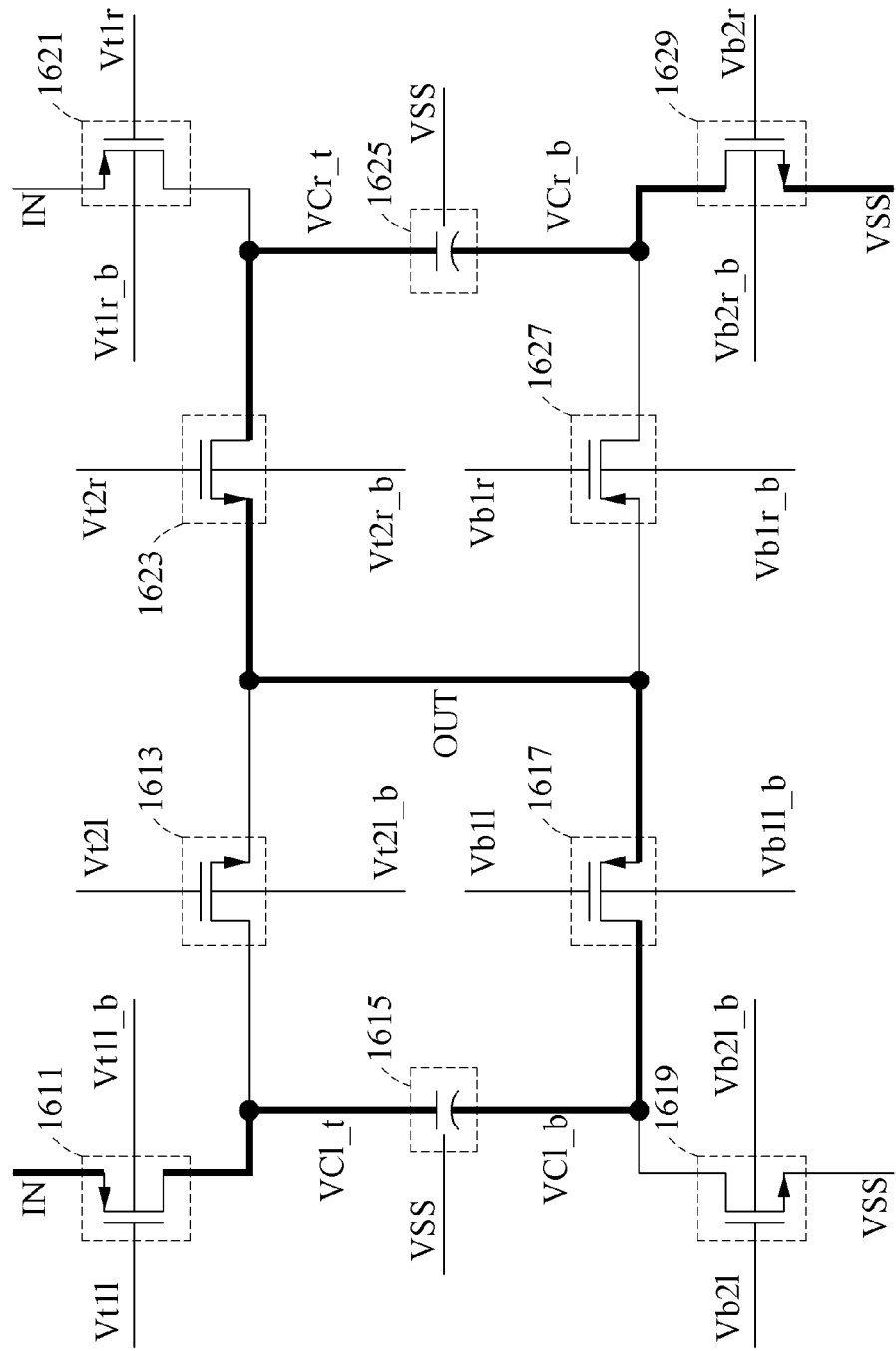
FIG. 16 illustrates an example of a second threshold voltage generation circuit of a reference clock generator.

FIG. 16 illustrates an example of a second threshold voltage generation circuit of a reference clock generator. Referring to FIG. 16, the second threshold voltage generation circuit includes transistors 1611, 1613, 1617, 1619, 1621, 1623, 1627 and 1629, and capacitors 1615 and 1625.

The second threshold voltage generation circuit adjusts a threshold voltage VTH_H to generate a second threshold voltage VTH_L. For example, the second threshold voltage generation circuit receives a signal IN, reduces the signal IN by half by adjusting the signal IN using the transistors 1611, 1613, 1617, 1619, 1621, 1623, 1627 and 1629 and the capacitors 1615 and 1625, and generates a signal OUT. In this example, the signal IN corresponds to the threshold voltage VTH_H, and the signal OUT corresponds to the second threshold voltage VTH_L.

The transistors 1611, 1613, 1617, 1619, 1621, 1623, 1627 and 1629 operate as switches. For example, control clock signals Vt1*l*, Vt1*l*_b, Vt2*l*, Vt2*l*_b, Vt1*r*, Vt1*r*_b, Vt2*r*, Vt2*r*_b, Vb1*l*, Vb1*l*_b, Vb2*l*, Vb2*l*_b, Vb1*r*, Vb1*r*_b, Vb2*r* and Vb2*r*_b are supplied to the transistors 1611, 1613, 1617, 1619, 1621, 1623, 1627 and 1629. Voltages VCl_t, VCl_b, VCr_t and VCr_b are applied to the capacitors 1615 and 1652. The transistors 1611, 1613, 1617, 1619, 1621, 1623, 1627 and 1629 are powered on to operate as low ON resistors based on the control clock signals Vt1*l*, Vt1*l*_b, Vt2*l*, Vt2*l*_b, Vt1*r*, Vt1*r*_b, Vt2*r*, Vt2*r*_b, Vb1*l*, Vb1*l*_b, Vb2*l*, Vb2*l*_b, Vb1*r*, Vb1*r*_b, Vb2*r* and Vb2*r*_b, or are powered off based on a gate voltage to operate as high OFF resistors.

The control clock signals Vt1*l*, Vt1*l*_b, Vt2*l*, Vt2*l*_b, Vt1*r*, Vt1*r*_b, Vt2*f*, Vt2*f*_b, Vb1*l*, Vb1*l*_b, Vb2*l*, Vb2*l*_b, Vb1*r*, Vb1*r*_b, Vb2*r* and Vb2*r*_b are generated based on control signals Vctrl_N, Vctrl_Nb, Vctrl_P and Vctrl_Pb. Levels of the control signals Vctrl_N, Vctrl_Nb, Vctrl_P and Vctrl_Pb need to be adjusted to operate the transistors 1611, 1613, 1617, 1619, 1621, 1623, 1627 and 1629 as low ON resistors or high OFF resistors.

The control clock signals Vt1*l*, Vt1*l*_*b*, Vt2*l*, Vt2*l*_*b*, Vt1*r*, Vt1*r*_*b*, Vt2*r*, Vt2*r*_*b*, Vb1*l*, Vb1*l*_*b*, Vb2*l*, Vb2*l*_*b*, Vb1*r*, Vb1*r*_*b*, Vb2*r* and Vb2*r*_*b* are generated by a control clock generation circuit. An example of the control clock generation circuit will be described with reference to FIGS. 17 through 24.

FIGS. 17 through 24 illustrate examples of a control clock generation circuit of a second threshold voltage generation circuit.

Referring to FIG. 17, a control clock generation circuit 1710 receives, as an input, a signal CLK_nb via a port CLKi_p, downshifts a voltage level of the signal CLK_nb, and outputs a control clock signal Vt1*l* via a port CLKo_p. An upper limit of the control clock signal Vt1*l* is a voltage value of a signal IN that is input via a port BASE. The signal IN corresponds to the signal IN of FIG. 16.

The control clock generation circuit 1710 receives, as an input, a signal CLK_pb via a port CLKi_n, downshifts a voltage level of the signal CLK_pb, and outputs a control clock signal Vt1*r* via a port CLKo_n. An upper limit of the control clock signal Vt1*r* is the voltage value of the signal IN that is input via the port BASE. For example, the signal CLK_nb supplied to the port CLKi_p corresponds to the control signal Vctrl_Nb supplied by the logic 1350 of FIG. 13, and the signal CLK_pb supplied to the port CLKi_n corresponds to the control signal Vctrl_Pb supplied by the logic 1350.

A capacitor 1721 and a diode 1723 generate a control clock signal Vt1*l*_*b* based on the control clock signal Vt1*l*. A capacitor 1731 and a diode 1733 generate a control clock signal Vt1*r*_*b* based on the control clock signal Vt1*r*. The control clock signal Vt1*l*_*b* is obtained by upshifting a voltage level of the control clock signal Vt1*l*. A bottom level of the control clock signal Vt1*l*_*b* is slightly less than a level (for example, about 138 mV) of the signal IN. The control clock signal Vt1*r*_*b* is obtained by upshifting a voltage level of the control clock signal Vt1*r*. A bottom level of the control clock signal Vt1*r*_*b* is slightly less than the level of the signal IN.

FIG. 22 illustrates an example of the control clock generation circuit 1710 of FIG. 17. Referring to FIGS. 17 and 22, the control clock generation circuit 1710 includes transistors 2211 and 2213 and capacitors 2215 and 2217.

Control signals Vctrl_Nb and Vctrl_Pb are input to input nodes CLKi_p and CLKi_n, and the control clock signals Vt1*l* and Vt1*r* are output from output nodes CLKo_n and CLKo_p. The upper limits of the control clock signals Vt1*l* and Vt1*r* are input to an input node BASE.

In timing diagrams in a lower portion of FIG. 22, a waveform 2221 represents the control signal Vctrl_Nb and a waveform 2223 represents the control clock signal Vt1*l*. Also, a waveform 2231 represents the control signal Vctrl_Pb and a waveform 2233 represents the control clock signal Vt1*r*. Accordingly, the control signals Vctrl_Nb and Vctrl_Pb are downshifted to the control clock signals Vt1*l* and Vt1*r* based on the upper limits of the control clock signals Vt1*l* and Vt1*r*.

Referring to FIG. 18, a control clock generation circuit 1810 receives, as an input, a signal CLK_p via a port CLKi_p, upshifts a voltage level of the signal CLK_p, and outputs a control clock signal Vt2*l* via a port CLKo_p. A lower limit of the control clock signal Vt2*l* is obtained by adding a threshold voltage value of an N-channel MOS (NMOS) transistor connected to a port BASE in the control clock generation circuit 1810 to a voltage value of a signal OUT input via the port BASE. The signal OUT corresponds to the signal OUT of FIG. 16.

The control clock generation circuit 1810 receives, as an input, a signal CLK_n via a port CLKi_n, upshifts a voltage level of the signal CLK_n, and outputs a control clock signal Vt2*r* via a port CLKo_n. An upper limit of the control clock signal Vt2*r* is obtained by adding the threshold voltage value of the NMOS transistor connected to the port BASE in the control clock generation circuit 1810 to a voltage value of a signal IN input via the port BASE. For example, the signal CLK_p supplied to the port CLKi_p corresponds to the control signal Vctrl_P supplied by the logic 1350 of FIG. 13, and the signal CLK_n supplied to the port CLKi_n corresponds to the control signal Vctrl_N supplied by the logic 1350.

The control clock generation circuit 1810 outputs the control clock signals Vt2*l* and Vt2*r* based on the control signals Vctrl_P and Vctrl_N and a preset lower limit. A capacitor 1821 and a diode 1823 generate a control clock signal Vt2*l*_*b* based on the control clock signal Vt2*l*. A capacitor 1831 and a diode 1833 generate a control clock signal Vt2*r*_*b* based on the control clock signal Vt2*r*.

FIG. 21 illustrates an example of the control clock generation circuit 1810 of FIG. 18. Referring to FIGS. 18 and 21, the control clock generation circuit 1810 includes transistors 2111 and 2113, and capacitors 2115 and 2117.

Control signals Vctrl_P and Vctrl_N are input to input nodes CLKi_p and CLKi_n, and the control clock signals Vt2*l* and Vt2*r* are output from output nodes CLKo_p and CLKo_n. To an input node BASE, a signal for lower limits of the control clock signals Vt2*l* and Vt2*r* are input.

In timing diagrams in a lower portion of FIG. 21, a waveform 2123 represents the control signal Vctrl_P and a waveform 2121 represents the control clock signal Vt2*l*. Also, a waveform 2133 represents the control signal Vctrl_N and a waveform 2131 represents the control clock signal Vt2*r*. Accordingly, the control signals Vctrl_P and Vctrl_N are upshifted to the control clock signals Vt2*l* and Vt2*r* based on the lower limit of the control clock signal Vt2*r*.

Referring to FIG. 19, a control clock generation circuit 1910 receives, as an input, a signal CLK_nb via a port CLKi_p, downshifts a voltage level of the signal CLK_nb, and outputs a control clock signal Vb1*l* via a port CLKo_p. An upper limit of the control clock signal Vb1*l* is a voltage value of a signal OUT that is input via a port BASE. The signal OUT corresponds to the signal OUT of FIG. 16.

The control clock generation circuit 1910 receives, as an input, a signal CLK_pb via a port CLKi_n, downshifts a voltage level of the signal CLK_pb, and outputs a control clock signal Vb1*r* via a port CLKo_n. An upper limit of the control clock signal Vb1*r* is the voltage value of the signal IN that is input via the port BASE. For example, the signal CLK_nb supplied to the port CLKi_p corresponds to the control signal Vctrl_Nb supplied by the logic 1350 of FIG. 13, and the signal CLK_pb supplied to the port CLKi_n corresponds to the control signal Vctrl_Pb supplied by the logic 1350.

The control clock generation circuit 1910 outputs the control clock signals Vb1*l* and Vb1*r* based on the control signals Vctrl_Nb and Vctrl_Pb and a preset upper limit. A capacitor 1921 and a diode 1923 generate a control clock signal Vb1*l*_*b* based on the control clock signal Vb1*l*. A capacitor 1931 and a diode 1933 generate a control clock signal Vb1*r*_*b* based on the control clock signal Vb1*r*. A lower limit of the control clock signal Vb1*l*_*b* is a value (for example, about 200 mV) that is slightly lower than power IN supplied to a p-terminal of the diode 1923. A lower limit of the control clock signal Vb1r_b is a value (for example, about 200 mV) that is slightly less than power IN supplied to a p-terminal of the diode 1933. The control clock generation circuit 1910 has a structure corresponding to the example of the control clock generation circuit 1710 of FIG. 22.

Referring to FIG. 20, a control clock generation circuit 2010 receives, as an input, a signal CLK_p via a port CLKi_p, upshifts a voltage level of the signal CLK_p, and outputs a control clock signal Vb2l via a port CLKo_p. A lower limit of the control clock signal Vb2l is set based on a voltage value of a signal VSS that is input via a port BASE. Also, the control clock generation circuit 2010 receives, as an input, a signal CLK_n via a port CLKi_n, upshifts a voltage level of the signal CLK_n, and outputs a control clock signal Vb2r via a port CLKo_n. A lower limit of the control clock signal Vb2r is set based on the voltage value of the signal VSS that is input via the port BASE. For example, the signal CLK_p supplied to the port CLKi_p corresponds to the control signal Vctrl_P supplied by the logic 1350 of FIG. 13, and the signal CLK_n supplied to the port CLKi_n corresponds to the control signal Vctrl_N supplied by the logic 1350.

A capacitor 2021 and a diode 2023 generate a control clock signal Vb2l_b based on the control clock signal Vb2l. A capacitor 2031 and a diode 2033 generate a control clock signal Vb2r_b based on the control clock signal Vb2r. The control clock generation circuit 2010 has a structure corresponding to the example of the control clock generation circuit 1810 of FIG. 21.

Referring to FIG. 23, a capacitor 2311 and a diode 2312 generate a control clock signal Vt1l_b based on a control clock signal Vt1l. In a timing diagram in a lower portion of FIG. 23, a waveform 2321 represents the control clock signal Vt1l_b, and a waveform 2323 represents the control clock signal Vt1l. A lower limit of the control clock signal Vt1l_b is a value (for example, about 138 mV) that is slightly less than a signal IN supplied to a p-terminal of the diode 2312.

Referring to FIG. 24, a capacitor 2411 and a diode 2413 generate a control clock signal Vt2l_b based on a control clock signal Vt2l. A voltage VSS is supplied as a lower limit to an input node of the capacitor 2413. In a timing diagram in a lower portion of FIG. 24, a waveform 2421 represents the control clock signal Vt2l and a waveform 2423 represents the control clock signal Vt2l_b. A lower limit of the control clock signal Vt2l_b is less than the voltage VSS.

Figure 25:
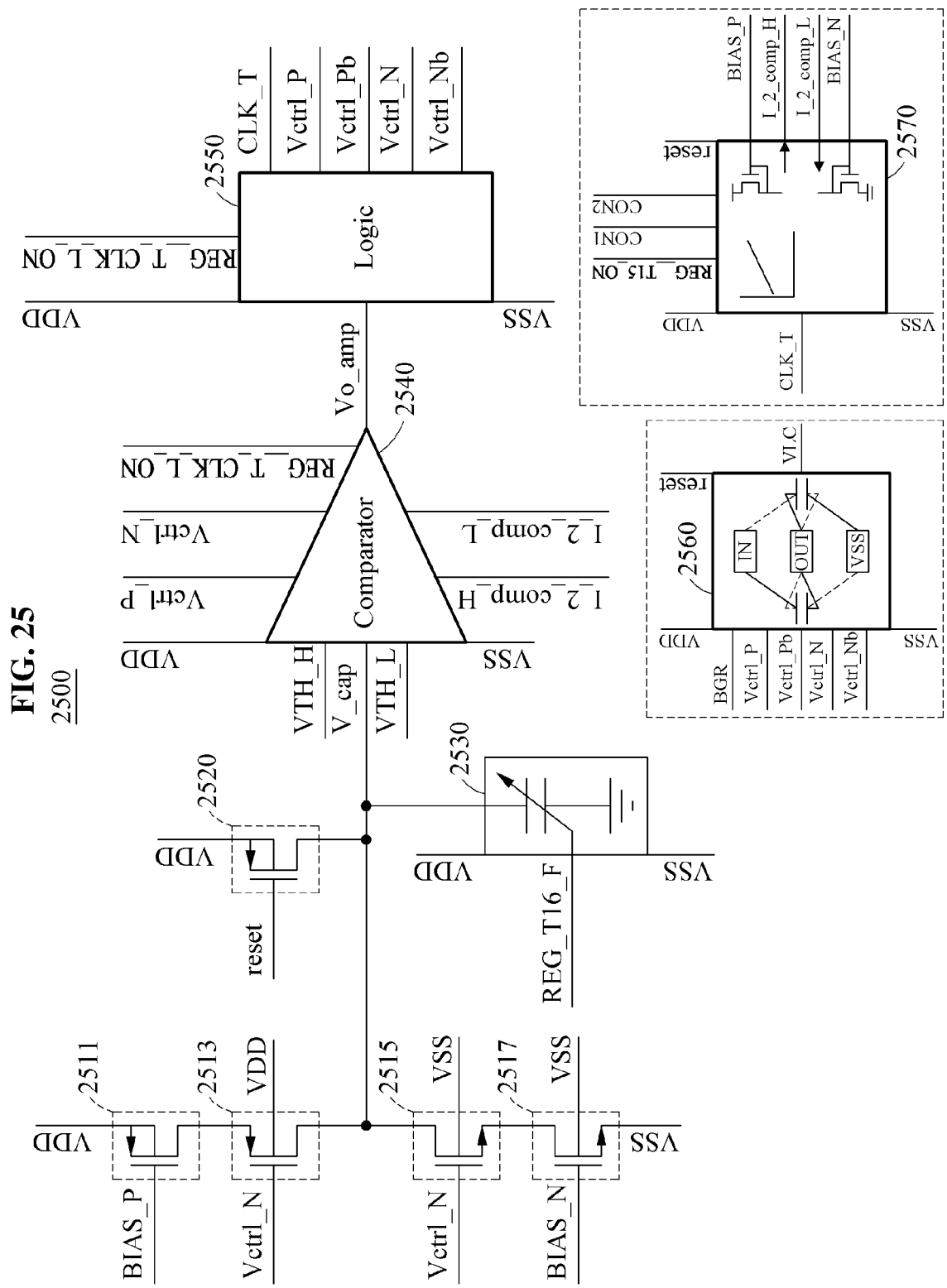
FIG. 25 illustrates an example of temperature clock generator.

FIG. 25 illustrates an example of a temperature clock generator. Referring to FIG. 25, the temperature clock generator includes a clock generation circuit 2500, a second threshold voltage generation circuit 2560 and a temperature current conversion circuit 2570. The clock generation circuit 2500 includes a switch circuit, a capacitor 2530, a comparator 2540 and a logic 2550. The switch circuit includes transistors 2511, 2513, 2515 and 2517.

The switch circuit charges the capacitor 2530 or discharges an electric charge of the capacitor 2530 based on temperature bias signals BIAS_P and BIAS_N. For example, the temperature bias signal BIAS_P is supplied to a gate of the transistor 2511, and the temperature bias signal BIAS_N is supplied to a gate of the transistor 2517. Control signals Vctrl_N are supplied to the transistors 2513 and 2515. The control signal Vctrl_N is output from the logic 2550.

When a channel is formed in the transistors 2511 and 2513 by the temperature bias signal BIAS_P and the control signal Vctrl_N, the capacitor 2530 is charged with an electric charge based on a voltage VDD. Also, when a channel is formed in the transistors 2515 and 2517 by the temperature bias signal BIAS_N and the control signal Vctrl_N, the electric charge is discharged from the capacitor 2530 based on a voltage VSS. A capacity of the capacitor 2530 is adjusted by a control signal REG_T16_F. The control signal REG_T16_F is a digital signal transferred from a register block (not shown). Settings of a circuit, for example, the capacitor 2530, is changed by changing a value of the register block using a digital interface, for example, a serial peripheral interface (SPI) or an inter-integrated circuit (I2C). A transistor 2520 initializes a voltage of the capacitor 2530 based on a reset signal reset.

The comparator 2540 compares a voltage V_cap formed based on the electric charge in the capacitor 2530 to a threshold voltage VTH_H and a second threshold voltage VTH_L. The comparator 2540 outputs a voltage Vo_amp based on control signals Vctrl_P, Vctrl_N, REG_T_CLK_L_ON, I_2_comp_H and I_2_comp_L. The description of the comparator 1340 of FIG. 13 and the description of FIG. 14 are also applicable to the comparator 2540, and are incorporated herein by reference. Thus, the above description is not repeated here.

The logic 2550 outputs a temperature clock signal CLK_T and control signals Vctrl_P, Vctrl_Pb, Vctrl_N and Vctrl_Nb based on the voltage Vo_amp. The logic 2550 operates based on the control signal REG_T_CLK_L_ON. The description of FIG. 15 is also applicable to the logic 2550, and are incorporated herein by reference. Thus, the above description is not repeated here. The control signal REG_T_CLK_L_ON is a digital signal received from a register block (not show) and is used to control whether the logic 2550 is to operate. As shown in FIG. 15, when the control signal REG_T_CLK_L_ON is logically low, a signal EN becomes logical low, and thus the circuit 1520 outputs a fixed logical signal regardless of an input signal.

The second threshold voltage generation circuit 2560 generates the second threshold voltage VTH_L based on the threshold voltage VTH_H. The threshold voltage VTH_H is supplied by the threshold voltage generator 1060 of FIG. 10. An input signal BGR of the second threshold voltage generation circuit 2560 corresponds to the threshold voltage VTH_H. The description of FIGS. 16 through 24 is also applicable to the second threshold voltage generation circuit 2560, and are incorporated herein by reference. Thus, the above description is not repeated here.

The temperature current conversion circuit 2570 outputs the temperature bias signals BIAS_P and BIAS_N based on a measured temperature. The temperature current conversion circuit 2570 operates in a settled state based on a temperature clock signal CLK_T. The temperature current conversion circuit 2570 receives control signals REG_T15_ON, CON1 and CON2, and inputs and outputs currents I_2_comp_H and I_2_comp_L. An example of the temperature current conversion circuit 2570 will be described with reference to FIG. 26.

Figure 26:
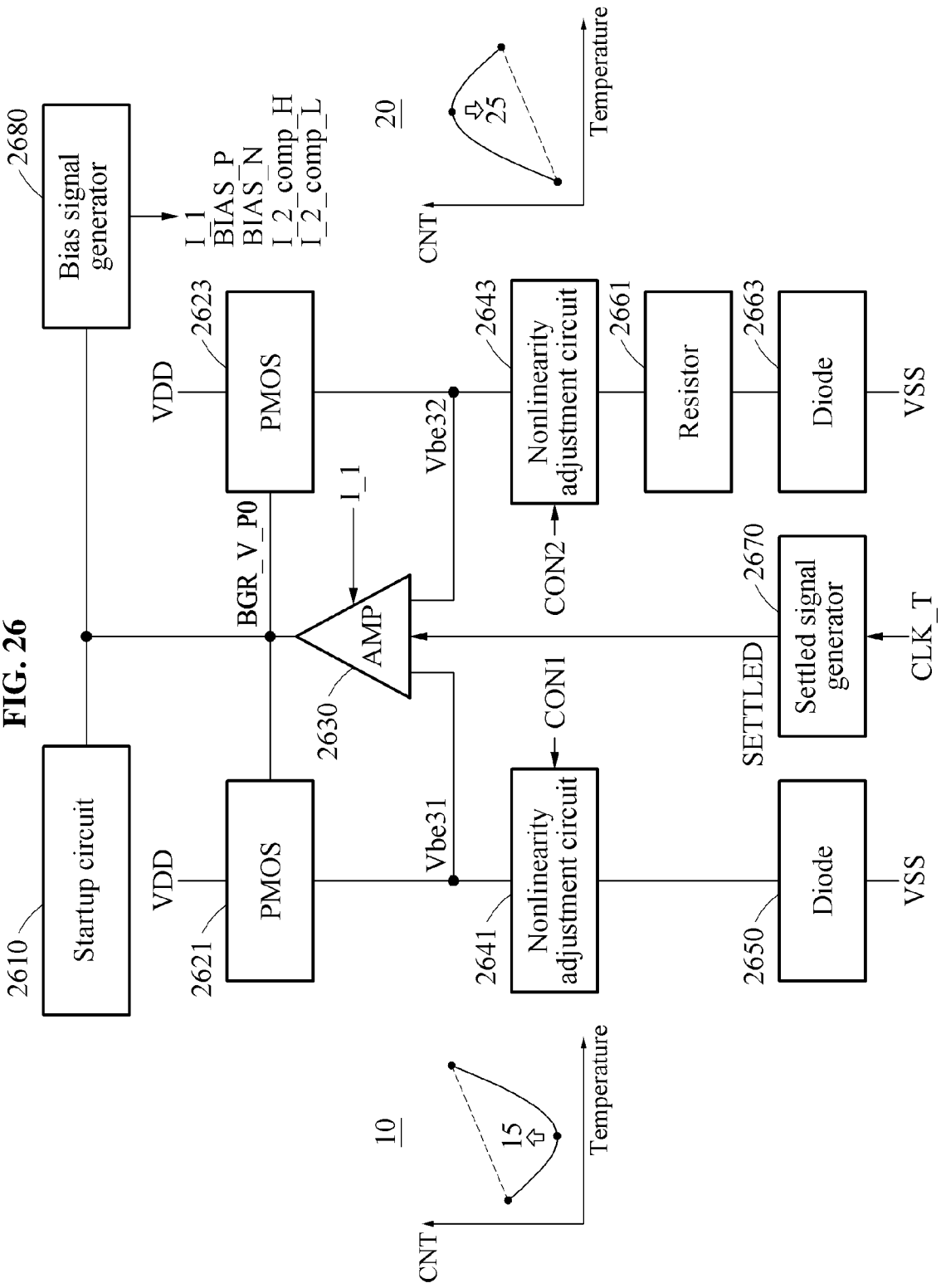
FIG. 26 illustrates an example of a temperature current conversion circuit of a temperature clock generator.

FIG. 26 illustrates an example of a temperature current conversion circuit of a temperature clock generator. Referring to FIG. 26, a startup circuit 2610 adjusts a voltage BGR_V_P0 applied to an output node of an amplifier 2630. The description of FIGS. 7 and 11 is also applicable to the startup circuit 2610.

Figure 27:
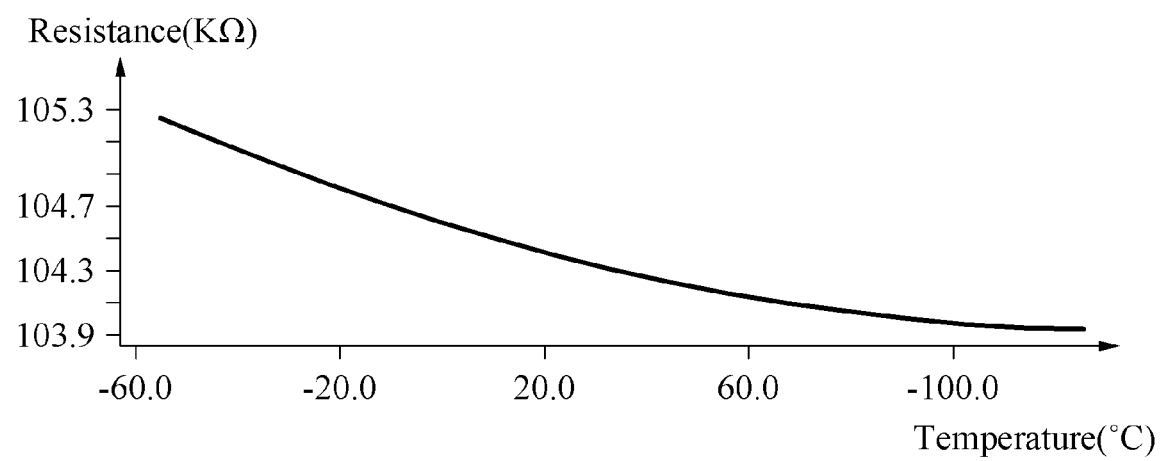
FIG. 27 illustrates an example of a linear resistance value.

A voltage Vbe31 is applied to a first input node of the amplifier 2630 and a voltage Vbe32 is applied to a second input node of the amplifier 2630. The voltage Vbe31 is formed by a PMOS transistor 2621, a nonlinearity adjustment circuit 2641 and a diode 2650. The voltage Vbe32 is formed by a PMOS transistor 2623, a nonlinearity adjustment circuit 2643, a resistor 2661 and a diode 2663. For example, the resistor 2661 is implemented as a "P+ poly resistor without silicide." Ideally, the resistor 2661 desirably has a resistance value independent of a temperature change, however, is slightly nonideal as shown in FIG. 27.

Based on control of the voltages Vbe31 and Vbe32, a nonlinearity of the temperature clock signal CLK_T is adjusted. The nonlinearity adjustment circuits 2641 and 2643 each include a device with a nonlinear value. Examples of the nonlinearity adjustment circuits 2641 and 2643 will be described with reference to FIGS. 28 and 29.

Figure 28:
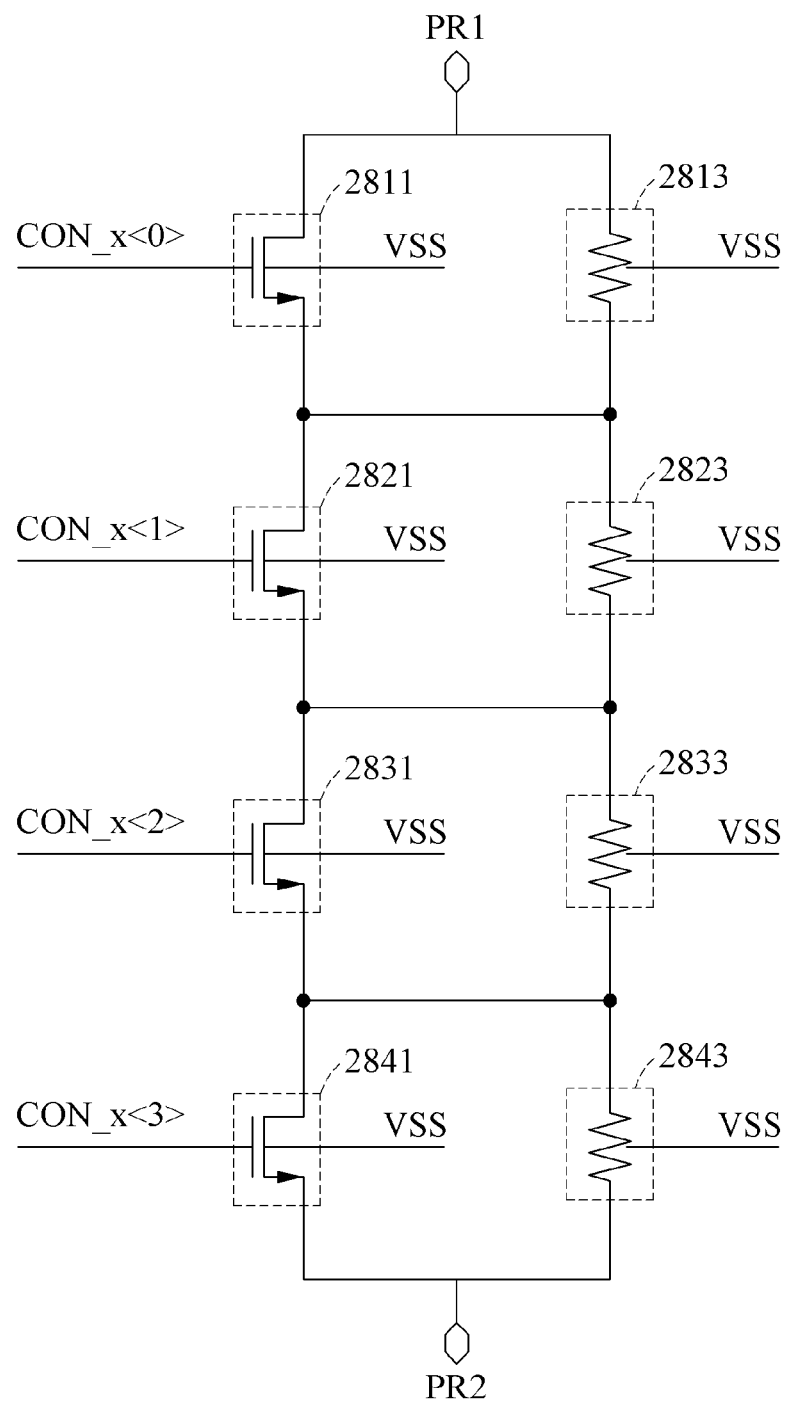
FIG. 28 illustrates an example of a nonlinearity adjustment circuit.
Figure 29:
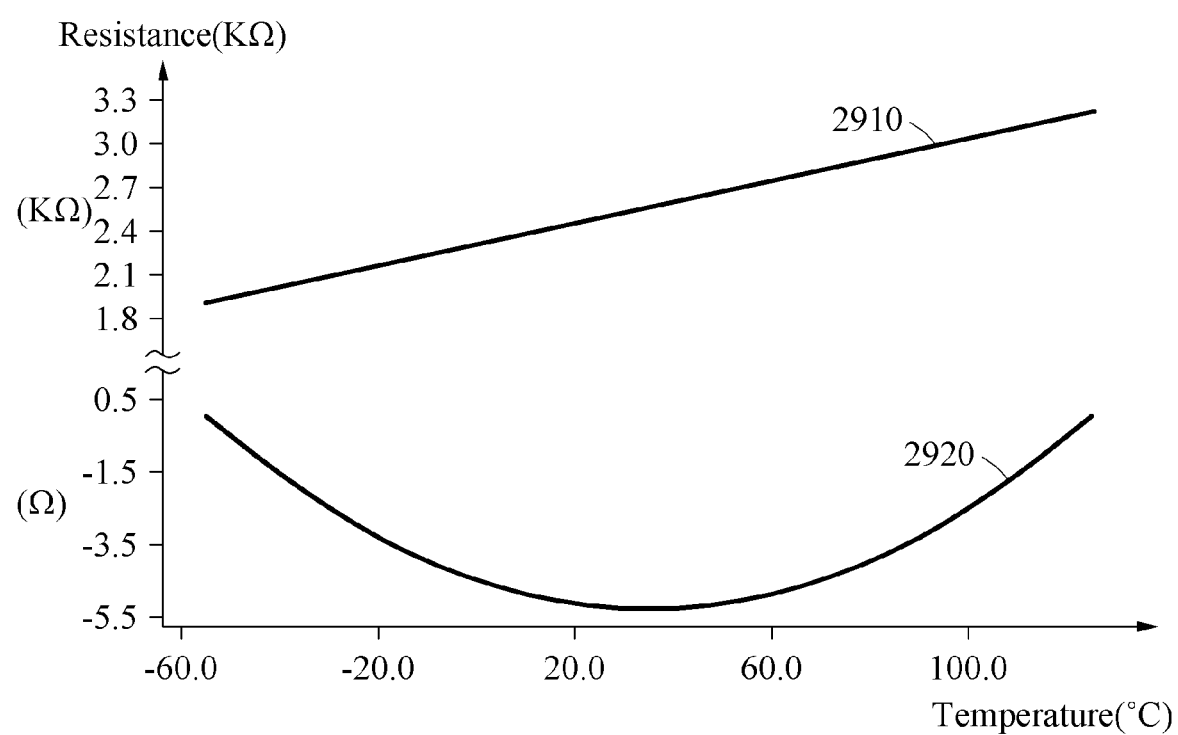
FIG. 29 illustrates an example of a linear component and a nonlinear component of a resistance.

FIG. 28 illustrates an example of a nonlinearity adjustment circuit, and FIG. 29 illustrates an example of a linear component and a nonlinear component of a resistance. Referring to FIG. 28, the nonlinearity adjustment circuit includes a switch circuit and resistors 2813, 2823, 2833 and 2843. The resistors 2813, 2823, 2833 and 2843 have nonlinear resistance values. The resistors 2813, 2823, 2833 and 2843 are implemented as, for example, "N+ poly resistors without silicide."

An example of a nonlinear resistance value is described with reference to FIG. 29. FIG. 29 illustrates a linear component 2910 and a nonlinear component 2920 of a resistance. A resistance value of each of the resistors 2813, 2823, 2833 and 2843 includes both the linear component 2910 and the nonlinear component 2920. Accordingly, a resistance value of each of the resistors 2813, 2823, 2833 and 2843 changes nonlinearly based on a temperature.

Referring to FIG. 28, the switch circuit includes transistors 2811, 2821, 2831 and 2841. The switch circuit controls a connection between the resistors 2813, 2823, 2833 and 2843 based on a control signal CON_x. For example, when the transistors 2811 and 2821 are powered on and the transistors 2831 and 2841 are powered off based on the control signal CON_x, a characteristic of the nonlinearity adjustment circuit is determined based on the resistors 2833 and 2843. The nonlinearity adjustment circuit controls the connection between the resistors 2813, 2823, 2833 and 2843 using the switch circuit, to adjust a nonlinearity of the temperature clock signal CLK_T.

Referring back to FIG. 26, the nonlinearity adjustment circuits 2641 and 2643 are included in the temperature current conversion circuit. The nonlinearity adjustment circuits 2641 and 2643 adjust the nonlinearity of the temperature clock signal CLK_T in opposite directions.

For example, count signals CNT are measured at a first temperature, a second temperature and a third temperature. In an example, when a count signal CNT measured at the second temperature is less than a linear expected value of the second temperature, the count signal CNT is represented by a waveform 10. To adjust the count signal CNT represented by the waveform 10 in a first direction 15, a nonlinearity degree of the nonlinearity adjustment circuit 2641 needs to be controlled. The nonlinearity adjustment circuit 2641 controls a nonlinearity degree of an internal resistance, to adjust the count signal CNT represented by the waveform 10 in the first direction 15.

In another example, when the count signal CNT measured at the second temperature is greater than the linear expected value of the second temperature, the count signal CNT is represented by a waveform 20. To adjust the count signal CNT represented by the waveform 20 in a second direction 25, a nonlinearity degree of the nonlinearity adjustment circuit 2643 needs to be controlled. The nonlinearity adjustment circuit 2643 controls a nonlinearity level of an internal resistance, to adjust the count signal CNT represented by the waveform 20 in the second direction 25.

Although the temperature current conversion circuit includes both the nonlinearity adjustment circuits 2641 and 2643 as illustrated in FIG. 26, this is merely an example. Depending on examples, the temperature current conversion circuit may include either the nonlinearity adjustment circuit 2641 or the nonlinearity adjustment circuit 2643.

The amplifier 2630 equalizes the voltages Vbe31 and Vbe32. The amplifier 2630 operates in an initial state or a settled state based on a settled signal SETTLED. A settled signal generator 2670 generates the settled signal SETTLED based on the temperature clock signal CLK_T. The description of FIG. 6 is also applicable to the amplifier 2630, and the description of FIGS. 4 and 5 is also applicable to the settled signal generator 2670.

A bias signal generator 2680 outputs bias signals BIAS_P and BIAS_N and current signals I_2_comp_H, I_2_comp_L and I_1, based on the voltage BGR_V_P0.

Figure 30:
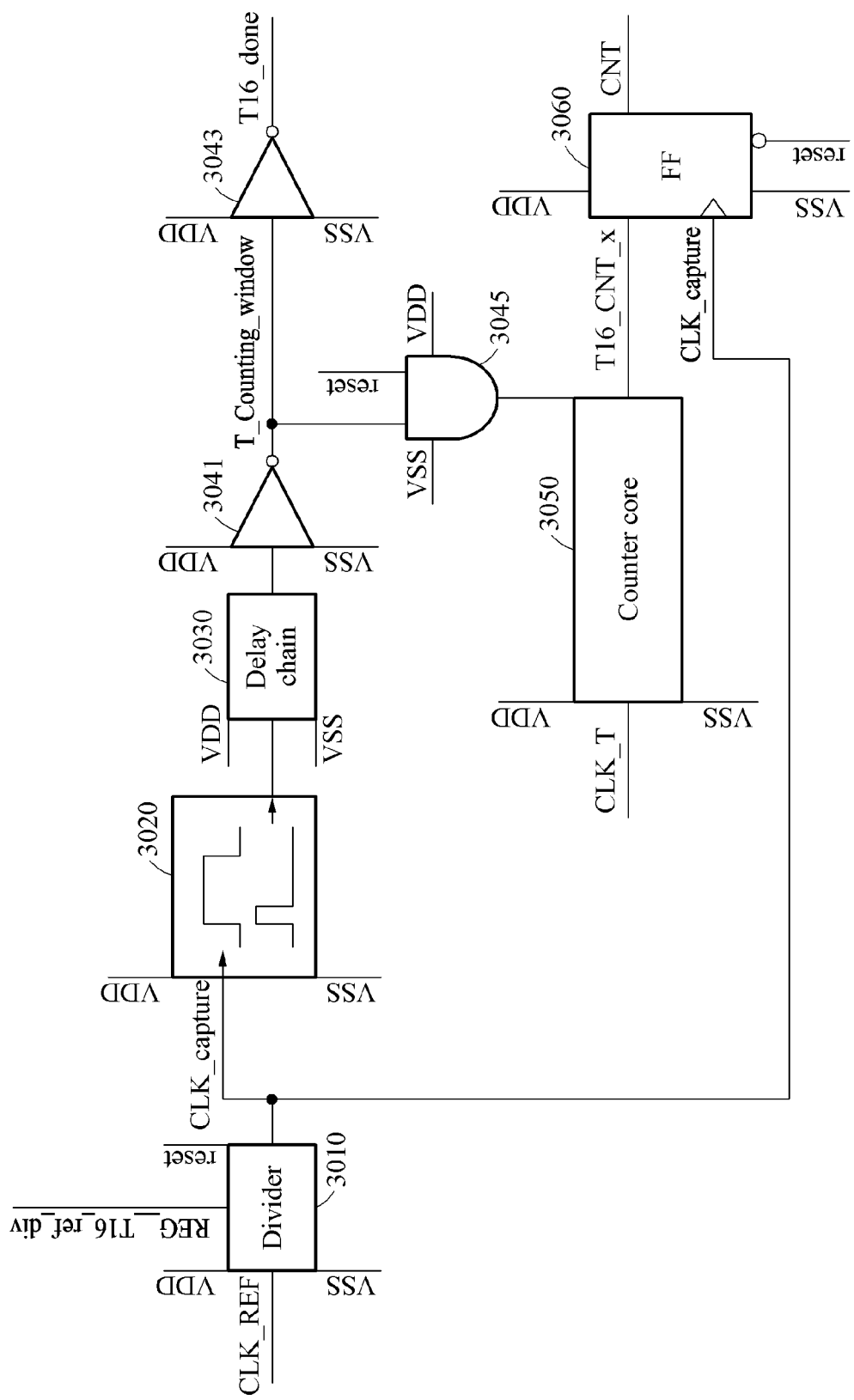
FIG. 30 illustrates an example of a counter circuit.

FIG. 30 illustrates an example of a counter circuit. Referring to FIG. 30, the counter circuit includes a divider 3010, an automatic pulse generator 3020, a delay chain 3030 and a counter core 3050.

To increase an accuracy of temperature measurement, a frequency of a reference clock signal CLK_REF needs to be reduced. The divider 3010 reduces the reference clock signal CLK_REF based on a control signal REG_T16_ref_div, and outputs a clock signal CLK_capture with a low frequency. An example of the divider 3010 will be described with reference to FIGS. 31 and 32.

Figure 31:
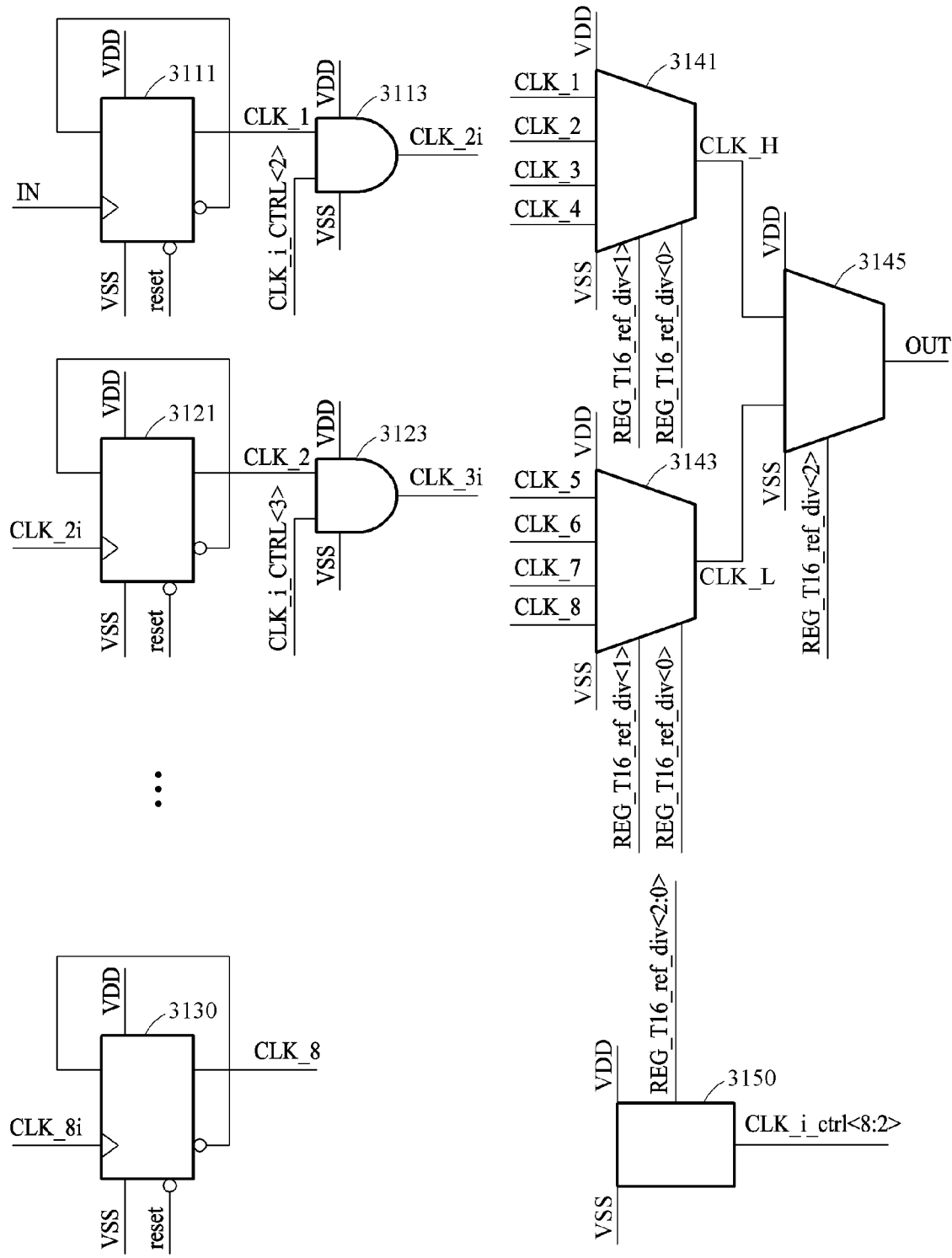
FIG. 31 illustrates an example of a divider of a counter circuit.

FIG. 31 illustrates an example of a divider of a counter circuit. Referring to FIG. 31, the divider includes flip-flops 3111, 3121 and 3130, AND gates 3113 and 3123, and multiplexers (MUXs) 3141, 3143 and 3145.

The flip-flops 3111, 3121 and 3130 reduce a frequency of a reference clock signal CLK_REF. The AND gates 3113 and 3123 output or block output signals of the flip-flops 3111, 3121 and 3130 based on a control signal CLK_i_CTRL.

By the control signal CLK_i_CTRL, a portion used to generate a clock signal in the counter circuit is activated. For example, to reduce the frequency of the reference clock signal CLK_REF by half, a control signal generator 3150 applies a logically low signal to AND gates other than the AND gate 3113 based on the control signal CLK_i_CTRL. Accordingly, a portion of flip-flops and AND gates are deactivated. Thus, the counter circuit operates at low power by the control signal CLK_i_CTRL.

The flip-flop 3111 receives the reference clock signal CLK_REF via an input node IN and outputs a clock signal CLK_1. A frequency of the clock signal CLK_1 is one half of the frequency of the reference clock signal CLK_REF. The AND gate 3113 outputs a clock signal CLK_2i based on the clock signal CLK_1 and the control signal CLK_i_CTRL.

The flip-flop 3121 receives the clock signal CLK_2i and outputs a clock signal CLK_2. A frequency of the clock signal CLK_2 is one half of the frequency of the clock signal CLK_1. In other words, the frequency of the clock signal CLK_2 is a ¼ of the frequency of the reference clock signal CLK_REF. The AND gate 3123 outputs a clock signal CLK_3i based on the clock signal CLK_2 and the control signal CLK_i_CTRL.

The flip-flop 3130 receives a clock signal CLK_8i and outputs a clock signal CLK_8. A frequency of the clock signal CLK_8 is ¹⁄₁₂₈ of the frequency of the reference clock signal CLK_REF.

The MUX 3141 multiplexes clock signals CLK_1, CLK_2, CLK_3 and CLK_4 based on a control signal REG_T16_ref_div and outputs a clock signal CLK_H. The MUX 3143 multiplexes clock signals CLK_5, CLK_6, CLK_7 and CLK_8 based on a control signal REG_T16_ref_div and outputs a clock signal CLK_L. The MUX 3145 multiplexes the clock signals CLK_H and CLK_L based on a control signal REG_T16_ref_div and outputs a clock signal CLK_capture via an output node OUT.

The control signal generator 3150 generates a control signal CLK_i_CTRL<8:2> based on a control signal REG_T16_ref_div<2:0>. An example of the control signal generator 3150 will be described with reference to FIG. 32.

Figure 32:
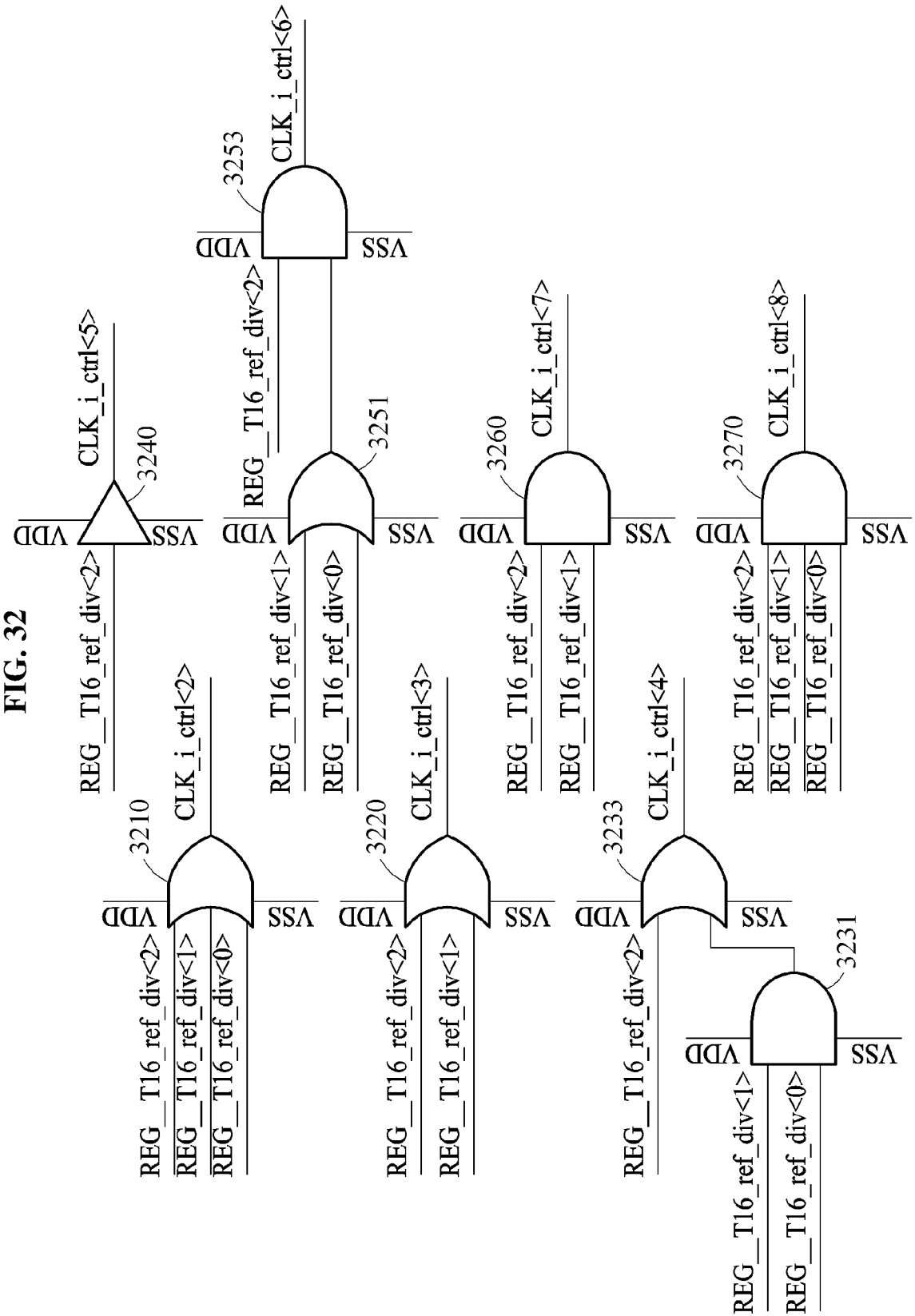
FIG. 32 illustrates an example of a control signal generator of a divider.

FIG. 32 illustrates an example of a control signal generator of a divider. The control signal generator includes logic gates as shown in FIG. 32. The control signal generator outputs a clock signal CLK_i_CTRL<8:2> based on a control signal REG_T16_ref_div<2:0>.

An OR gate 3210 outputs a clock signal CLK_i_CTRL<2> based on a control signal REG_T16_ref_div<2:0>. An OR gate 3220 outputs a clock signal CLK_i_CTRL<3> based on a control signal REG_T16_ref_div<2:1>.

An AND gate 3231 outputs a signal based on a control signal REG_T16_ref_div<1:0>. An OR gate 3233 outputs a clock signal CLK_i_CTRL<4> based on a control signal REG_T16_ref_div<2> and the signal output from the AND gate 3231.

An inverter 3240 outputs a clock signal CLK_i_CTRL<5> based on a control signal REG_T16_ref_div<2>.

An OR gate 3251 outputs a signal based on a control signal REG_T16_ref_div<1:0>. An AND gate 3253 outputs a clock signal CLK_i_CTRL<6> based on a control signal REG_T16_ref_div<2> and the signal output from the OR gate 3251.

An AND gate 3260 outputs a clock signal CLK_i_CTRL<7> based on a control signal REG_T16_ref_div<2:1>. An AND gate 3270 outputs a clock signal CLK_i_CTRL<8> based on a control signal REG_T16_ref_div<2:0>.

Referring back to FIG. 30, the automatic pulse generator 3020 outputs a pulse signal based on a clock signal CLK_capture. The pulse signal is a signal in which a rising edge of the clock signal CLK_capture is processed in a form of a pulse. An example of the automatic pulse generator 3020 will be described with reference to FIG. 33.

Figure 33:
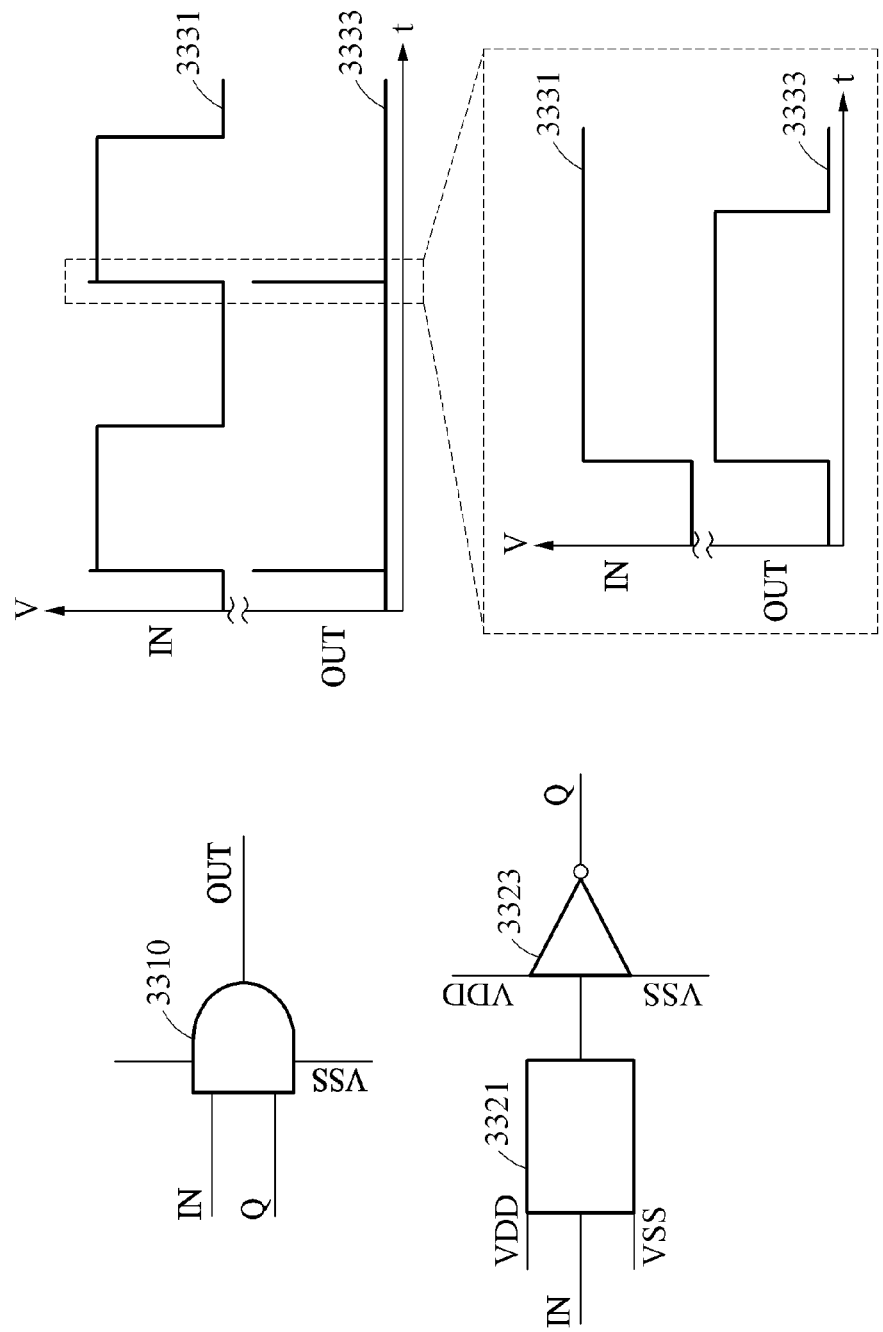
FIG. 33 illustrates an example of an automatic pulse generator of a counter circuit.

FIG. 33 illustrates an example of an automatic pulse generator of a counter circuit. Referring to FIG. 33, a delay unit 3321 receives a clock signal CLK_capture via an input node IN and outputs a delayed clock signal. An inverter 3323 inverts the delayed clock signal and outputs a signal Q.

An AND gate 3310 outputs a pulse signal based on a logic operation of the clock signal CLK_capture and the signal Q. In a timing diagram of FIG. 33, a waveform 3331 represents the clock signal CLK_capture and a waveform 3333 represents the pulse signal output from the AND gate 3310.

A pulse signal is inverted by an inverter 3041 of FIG. 30, which will be described below. A signal inverted from the pulse signal is maintained to be logically high during the same cycle, and changes to be logically low when a cycle changes. Accordingly, the counter core 3050 counts pulses of the temperature clock signal CLK_T during a single cycle of the reference clock signal CLK_REF, more accurately during a single cycle of the clock signal CLK_capture, based on the signal inverted from the pulse signal. For example, a single cycle of the reference clock signal CLK_REF is understood as a counting interval of the reference clock signal CLK_REF.

Referring back to FIG. 30, the delay chain 3030 delays a pulse signal. A predetermined difference between the delayed pulse signal and the clock signal CLK_capture occurs. An example of the delay chain 3030 will be described with reference to FIG. 34.

Figure 34:
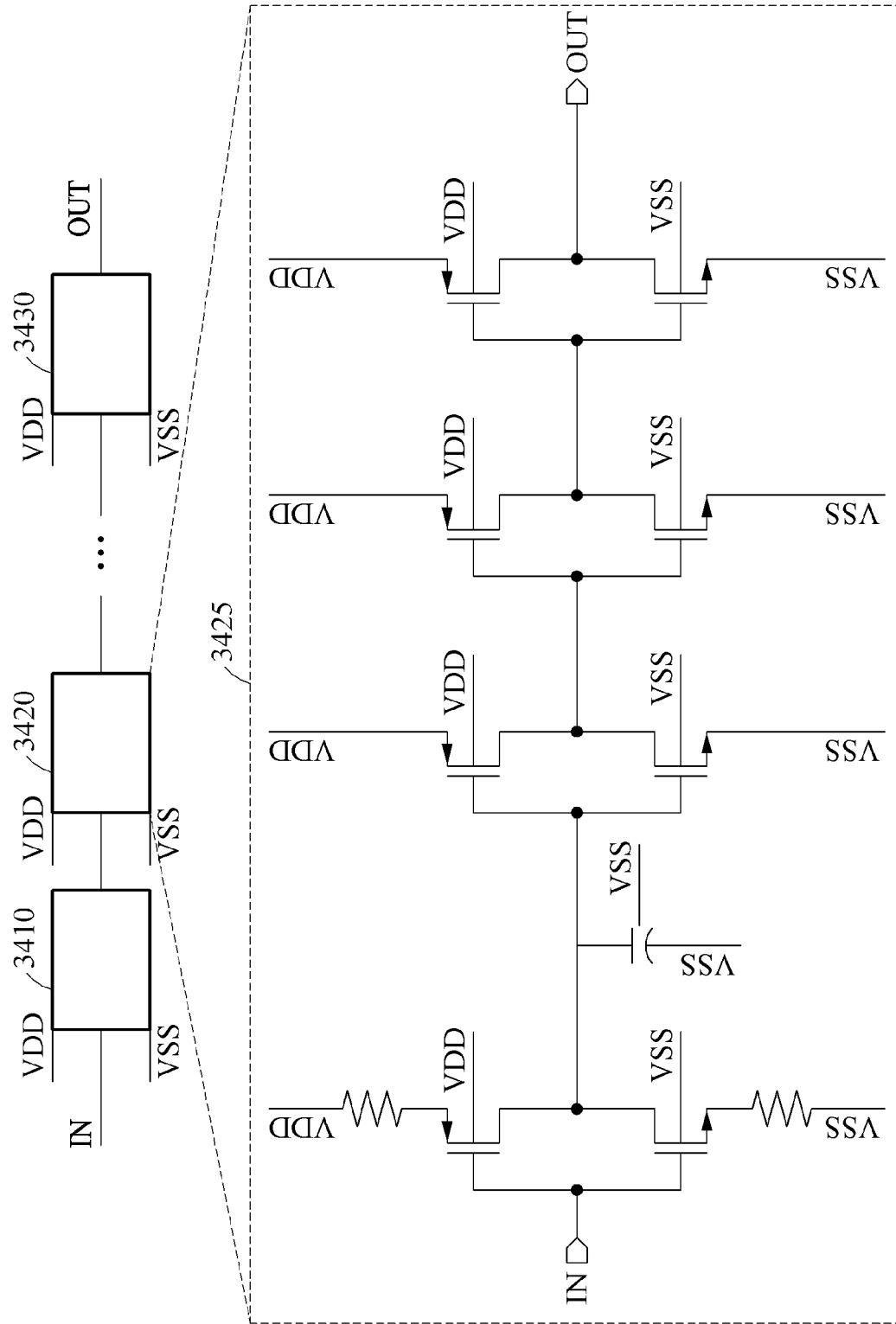
FIG. 34 illustrates an example of a delay chain of a counter circuit.

FIG. 34 illustrates an example of a delay chain of a counter circuit. Referring to FIG. 34, the delay chain includes delay chain units 3410, 3420 and 3430. An example of the delay chain unit 3420 is represented by a block 3425. The other delay chain units are also implemented as, for example, the block 3425. The delay chain unit 3420 includes registers, resistors and capacitors.

The delay chain unit 3420 receives a signal from the delay chain unit 3410, delays the received signal, and transmits the delayed signal to a next delay chain unit. A pulse signal is input via an input node IN of the delay chain unit 3410, and a delayed pulse signal is output via an output node OUT of the delay chain unit 3430.

Referring back to FIG. 30, the inverter 3041 inverts a delayed pulse signal and outputs a signal T_Counting_window, and an inverter 3043 inverts the signal T_Counting_window and outputs a signal T16_done. An AND gate 3045 performs a logic operation based on the signal T_Counting_window and a reset signal reset.

The counter core 3050 outputs a signal T16_CNT_x<n:0> based on the temperature clock signal CLK_T and an output signal of the AND gate 3045. A flip-flop 3060 outputs a count signal CNT<n:0> based on a signal T16_CNT_x<n:0> and a clock signal CLK_capture. An example of the counter core 3050 will be described with reference to FIGS. 35A, 35B and 35C.

Figure 35A:
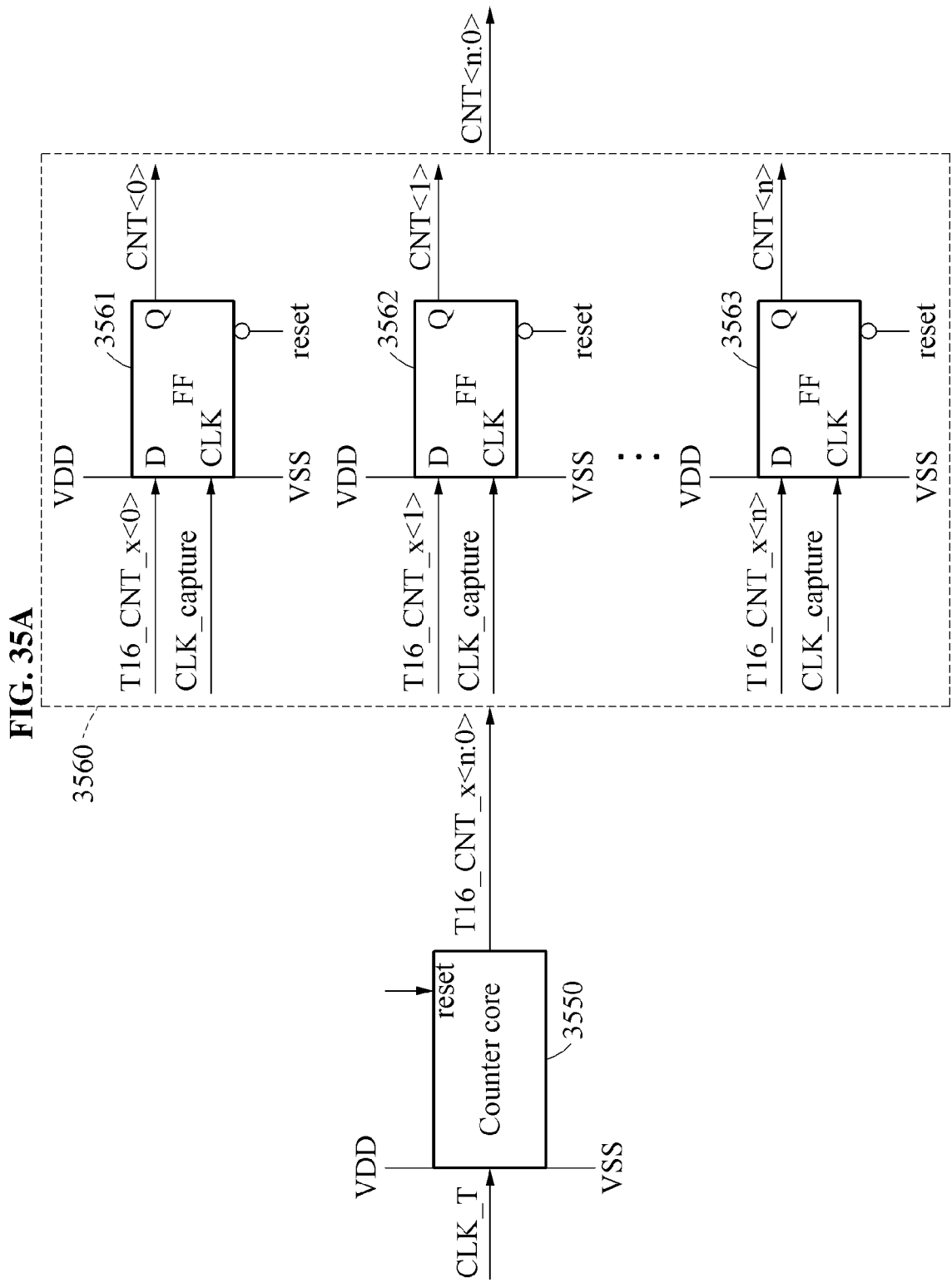
FIG. 35A illustrates an example of a counter core and flip-flop of a counter circuit.

FIG. 35A illustrates an example of a counter core and flip-flop of a counter circuit. Referring to FIG. 35A, a flip-flop block 3560 includes a plurality of flip-flops, for example, flip-flops 3561, 3562 and 3563. Similarly to the flip-flop block 3560, the flip-flop 3060 of FIG. 30 includes a plurality of flip-flops. A signal T16_CNT_x<n:0> output from a counter core 3550 is transmitted to the flip-flops 3561, 3562 and 3563. For example, a signal T16_CNT_x<0> is transmitted to the flip-flop 3561, and a signal T16_CNT_x<1> is transmitted to the flip-flop 3562. Also, a signal T16_CNT_x<n> is transmitted to the flip-flop 3563. Although three flip-flops, for example, the flip-flops 3561, 3562 and 3563 are illustrated in FIG. 35A, this is merely an example. In an example, the flip-flop block 3560 includes "n+1" flip-flops.

When a logical high signal is provided via a port reset, the counter core 3550 continues to count pulses of a temperature clock signal CLK_T. Accordingly, the signal T16_CNT_x<n:0> continues to be transmitted to a port D of the flip-flop block 3560. When a logically low signal is received to the port reset of the counter core 3550, all values of the signal T16_CNT_x<n:0> become logical low. Thus, a value of the signal T16_CNT_x<n:0> needs to be stored before a cycle of a single counting window ends. To this end, the flip-flop block 3560 stores a value of the counter core 3550 at a rising edge of a clock signal CLK_capture in a count signal CNT<n:0>.

Figure 35B:
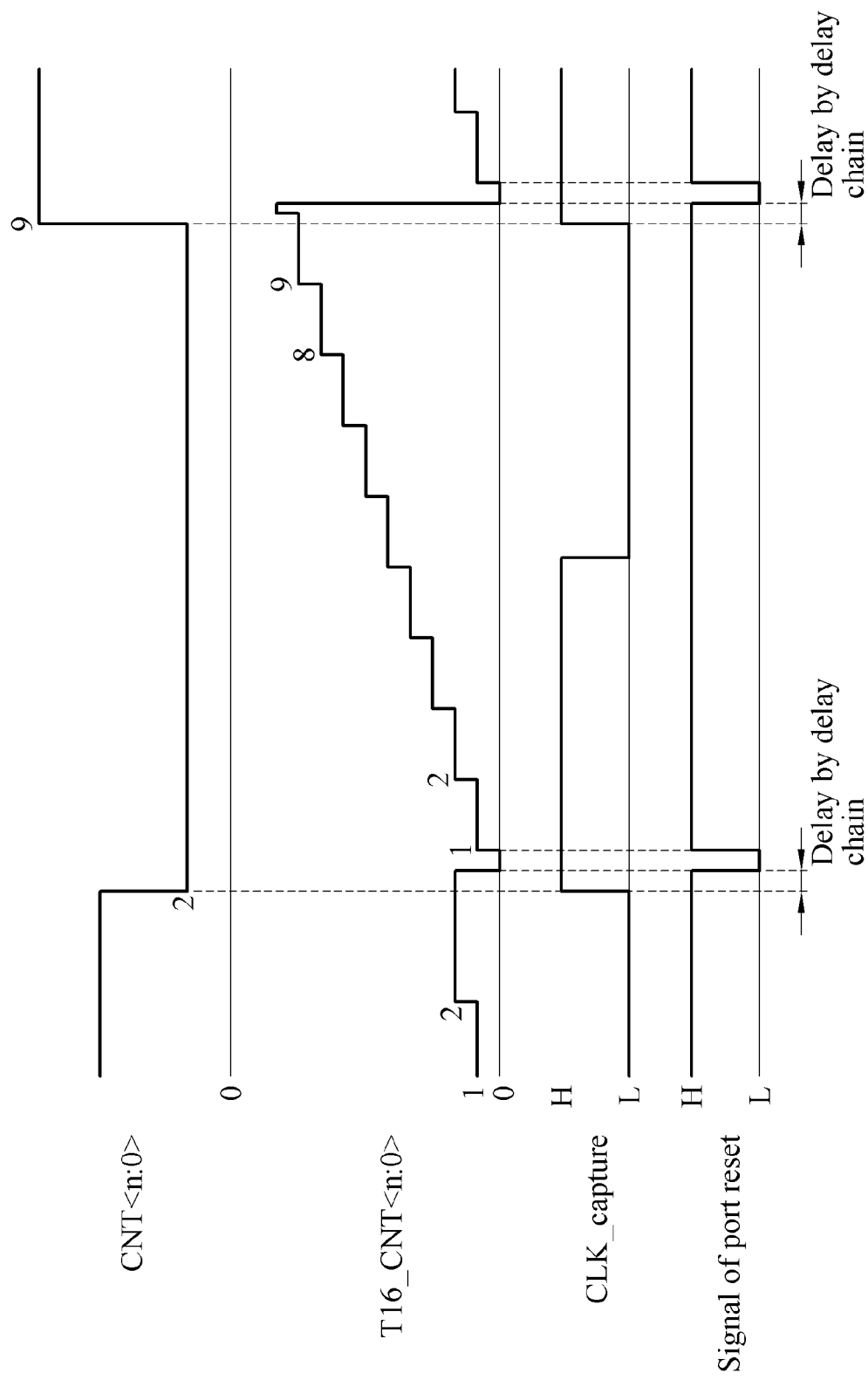
FIG. 35B illustrates an example of signals generated in a counter circuit.

FIG. 35B illustrates an example of signals generated in a counter circuit. Referring to FIG. 35B, a signal is supplied to a port reset of a counter core. A clock signal CLK_capture is not affected by a delay chain, and a count signal CNT<n:0> is output based on the clock signal CLK_capture. A signal of the port reset is delayed by the delay chain, and a signal T16_CNT<n:0> is output based on the signal of the port reset. Accordingly, the same difference as a delay caused by the delay chain occurs between the count signal CNT<n:0> and the clock signal CLK_capture that is not affected by the delay chain, and the signal T16_CNT<n:0> and the signal of the port reset that is affected by the delay chain.

As described above, the counter core 3550 continues to count pulses of the temperature clock signal CLK_T while the signal of the port reset has a logical high value. Accordingly, in a first counting interval, a value of the signal T16_CNT<n:0> increases to "2," a value of the count signal CNT<n:0> is stored as "2" at a first rising edge of the clock signal CLK_capture. When the signal of the port reset has a logical low value, the signal T16_CNT<n:0> has a logical low value. In a second counting interval, the value of the signal T16_CNT<n:0> increases to "9," and the value of the count signal CNT<n:0> is stored as "9" at a second rising edge of the clock signal CLK_capture.

Figure 35C:
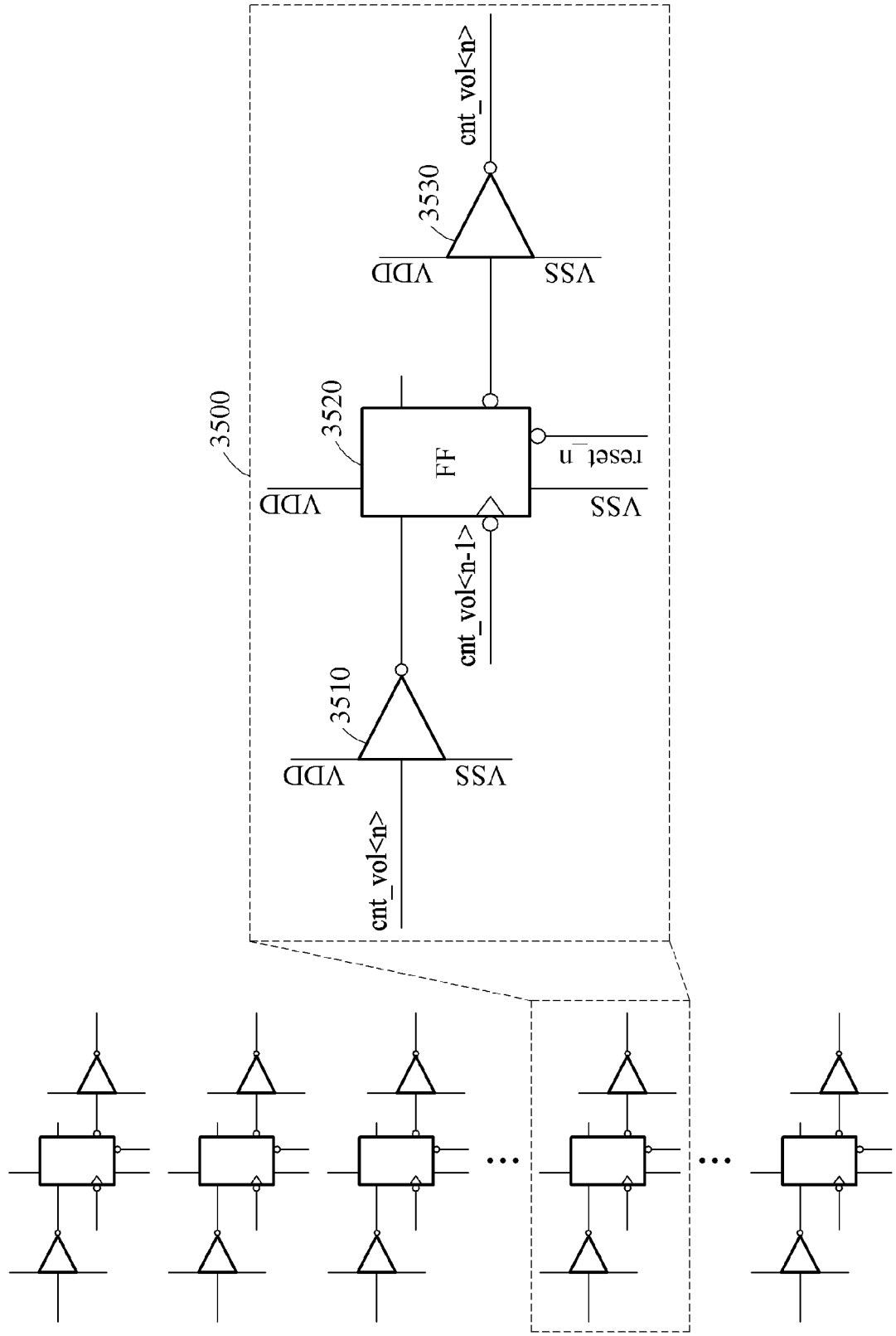
FIG. 35C illustrates an example of a counter core of a counter circuit.

FIG. 35C illustrates an example of a counter core of a counter circuit. Referring to FIG. 35C, the counter core includes counter units.

A block 3500 illustrates an example of an n-th counter unit. The n-th counter unit includes inverters 3510 and 3530 and a flip-flop 3520. The inverter 3510 inverts a count signal cnt_vol<n> of the n-th counter unit. The flip-flop 3520 receives an inverted signal of the count signal cnt_vol<n> via an input node, and receives a count signal cnt_vol<n−1> of an (n−1)-th counter unit via a clock node. The inverter 3530 outputs a count signal cnt_vol<n> based on a signal output from the flip-flop 3520.

An output signal of the above-described AND gate 3045 of FIG. 30 is input to a reset node reset_n of the flip-flop 3520. Thus, a counter core counts clocks of a temperature clock signal CLK_T corresponding to a counting interval of a reference clock signal CLK_REF, and outputs a count signal.

Figure 36:
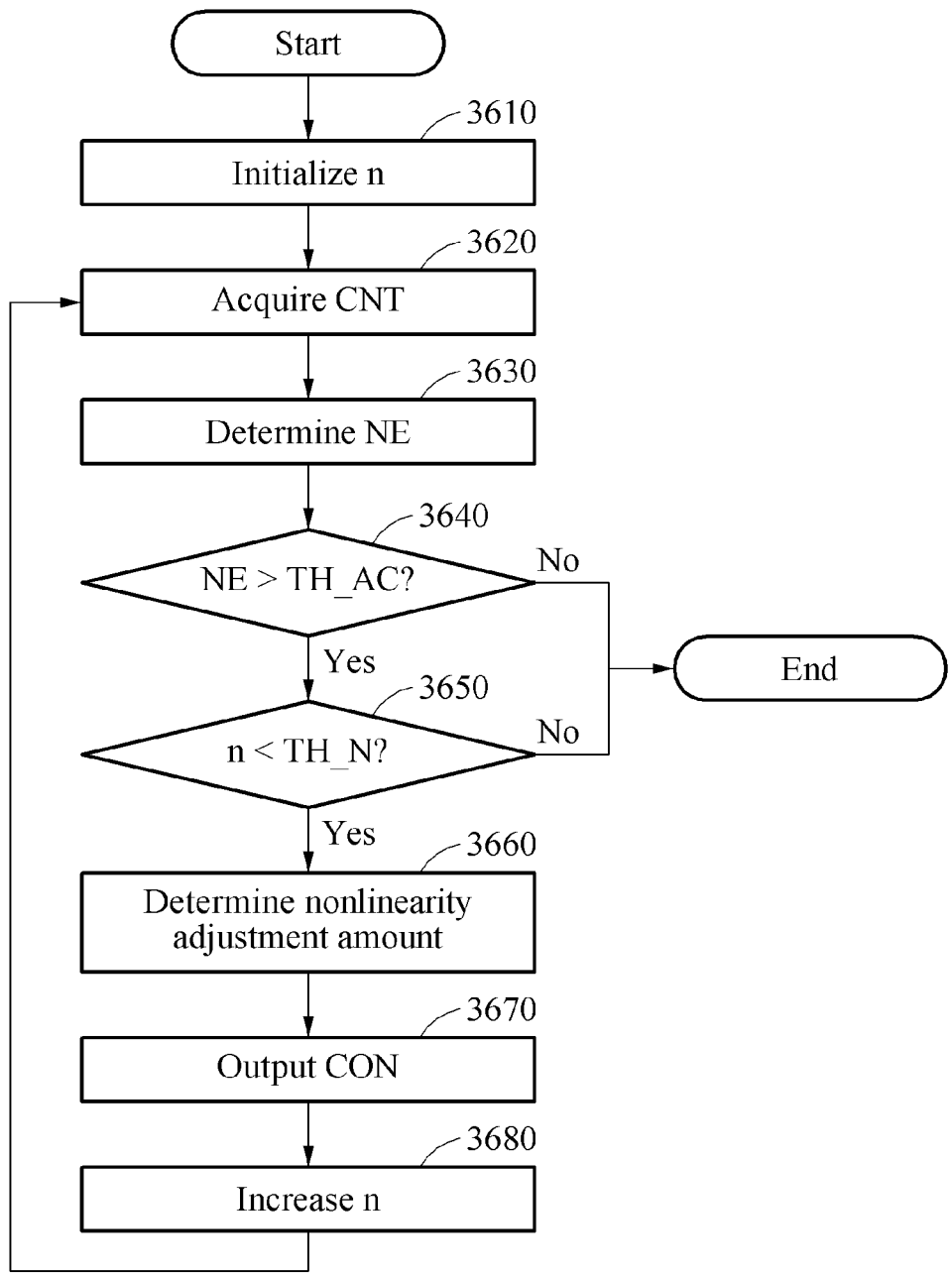
FIG. 36 is a diagram illustrating an example of a calibration method of a controller.

FIG. 36 is a diagram illustrating an example of a calibration method of a controller. The operations in FIG. 36 may be performed in the sequence and manner as shown, although the order of some operations may be changed or some of the operations omitted without departing from the spirit and scope of the illustrative examples described. Many of the operations shown in FIG. 36 may be performed in parallel or concurrently. One or more blocks of FIG. 36, and combinations of the blocks, can be implemented by special purpose hardware-based computer that perform the specified functions, or combinations of special purpose hardware and computer instructions. In addition to the description of FIG. 36 below, the descriptions of FIGS. 1-35C are also applicable to FIG. 36, and are incorporated herein by reference. Thus, the above description may not be repeated here.

Referring to FIG. 36, in operation 3610, the controller initializes a parameter n. The parameter n is a number of times a nonlinearity is controlled based on a control signal CON. In operation 3620, the controller acquires a count signal CNT. For example, a temperature sensor outputs a count signal CNT based on a measured temperature among temperatures. The temperatures include, for example, the first temperature, the second temperature and the third temperature of FIG. 2.

In operation 3630, the controller determines a nonlinear error NE. For example, the controller determines a linear expected value based on a count signal CNT generated at a first temperature and a count signal CNT generated at a third temperature, and determines a nonlinear error NE as a difference between the linear expected value and a count value of a count signal CNT corresponding to a second temperature.

In operation 3640, the controller compares the nonlinear error NE to a threshold TH_AC. The threshold TH_AC is determined based on a desired accuracy of temperature measurement. For example, when a higher accuracy is needed, the threshold TH_AC is determined as a smaller value. When the nonlinear error NE is greater than the threshold TH_AC, the controller performs operation 3650. When the nonlinear error NE is less than the threshold TH_AC, the controller terminates the calibration method.

In operation 3650, the controller compares the parameter n to a threshold TH_N. When the parameter n is less than the threshold TH_N, the controller performs operation 3660. When the parameter n is greater than the threshold TH_N, the controller terminates the calibration method. A number of repetitions of the calibration method is limited by the threshold TH_N, and accordingly it is possible to prevent an infinite loop of the calibration method.

In operation 3660, the controller determines a nonlinearity adjustment amount. The nonlinearity adjustment amount is determined based on the nonlinear error NE. For example, the nonlinearity adjustment amount is determined as "NE× α." In an example, α denotes an adjustment weight and is determined based on a process and design of a temperature sensor. In an example, α is determined by a characteristic of a resistor included in a nonlinearity adjustment circuit of a temperature sensor.

For example, a temperature sensor includes a first nonlinearity adjustment circuit and a second nonlinearity adjustment circuit. In operation 3660, the controller selects, as a control target, one of the first nonlinearity adjustment circuit and the second nonlinearity adjustment circuit. When the first nonlinearity adjustment circuit is selected as a control target, the controller controls the first nonlinearity adjustment circuit based on the control signal CON.

In operation 3670, the controller outputs the control signal CON. In an example, a nonlinearity adjustment circuit of a temperature sensor includes a switch circuit and resistors. The resistors of the nonlinearity adjustment circuit include nonlinear components with respect to a temperature. The nonlinearity adjustment circuit operates the switch circuit based on the control signal CON. Based on an operation of the switch circuit, the resistors of the nonlinearity adjustment circuit are partially connected to or disconnected from each other, and accordingly a nonlinearity of the count signal CNT is adjusted. The nonlinearity of the count signal CNT is represented by the nonlinear error NE, and the nonlinearity adjustment circuit controls the nonlinear error NE to be reduced based on the control signal CON.

In operation 3680, the controller increments the parameter n. After operation 3680, operation 3620 is performed.

Figure 37:
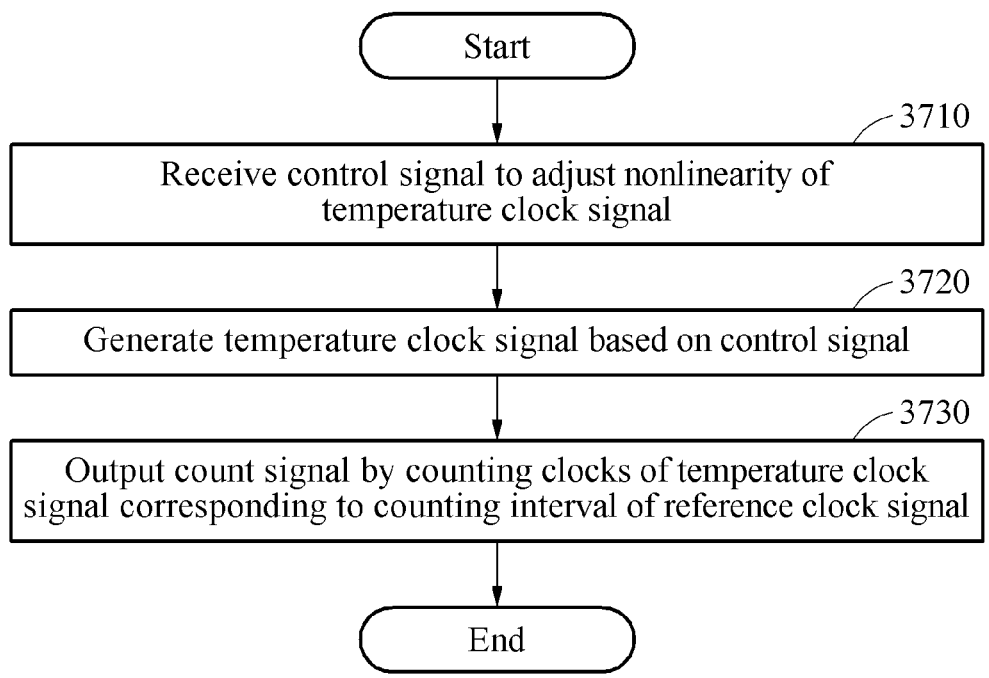
FIG. 37 is a diagram illustrating an example of a method of sensing a temperature.

FIG. 37 is a flowchart illustrating an example of a method of sensing a temperature. The operations in FIG. 37 may be performed in the sequence and manner as shown, although the order of some operations may be changed or some of the operations omitted without departing from the spirit and scope of the illustrative examples described. Many of the operations shown in FIG. 37 may be performed in parallel or concurrently. One or more blocks of FIG. 37, and combinations of the blocks, can be implemented by special purpose hardware-based computer that perform the specified functions, or combinations of special purpose hardware and computer instructions. In addition to the description of FIG. 37 below, the descriptions of FIGS. 1-36 are also applicable to FIG. 37, and are incorporated herein by reference. Thus, the above description may not be repeated here.

Referring to FIG. 37, in operation 3710, a temperature sensing apparatus receives a control signal to adjust a nonlinearity of a temperature clock signal. In operation 3720, the temperature sensing apparatus generates the temperature clock signal based on the control signal. In operation 3730, the temperature sensing apparatus outputs a count signal by counting clocks of the temperature clock signal corresponding to a counting interval of a reference clock signal.

The apparatuses, units, blocks, devices, and other components illustrated in FIGS. 1 through 26, 28, 30 through 35A and 35C that perform the operations described herein with respect to FIGS. 36 and 37 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 36-37 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A temperature sensor comprising:
a temperature clock generator configured to generate a temperature clock signal based on a control signal to adjust a nonlinearity of the temperature clock signal;
a reference clock generator configured to generate a reference clock signal; and
a counter circuit configured to output a count signal by counting clocks of the temperature clock signal corresponding to a counting interval of the reference clock signal,
wherein the temperature clock generator comprises a nonlinearity adjustment circuit comprising
resistors with nonlinear resistance values, and
a switch circuit configured to control a connection between the resistors based on the control signal.

2. The temperature sensor of claim 1, wherein the nonlinearity adjustment circuit configured to control a device with a nonlinear value based on the control signal, and to adjust a nonlinearity of the temperature clock signal.

3. The temperature sensor of claim 1, further comprising:
a reference voltage generator configured to generate a threshold voltage used to generate the temperature clock signal and the reference clock signal, and to supply the threshold voltage to the temperature clock generator and the reference clock generator.

4. The temperature sensor of claim 3, wherein the reference voltage generator comprises:
an amplifier configured to equalize a voltage of a first input node to a voltage of a second input node; and
a threshold voltage generator configured to generate the threshold voltage based on a voltage applied to an output node of the amplifier.

5. The temperature sensor of claim 3, wherein an operating state of the reference voltage generator is switched from an initial state to a settled state based on a settled signal generated by the reference clock signal.

6. The temperature sensor of claim 1, wherein the temperature clock generator comprises:
a temperature current conversion circuit configured to generate a temperature bias signal used to determine a frequency of the temperature clock signal; and
a clock generation circuit configured to generate the temperature clock signal based on the temperature bias signal and a threshold voltage.

7. The temperature sensor of claim 6, wherein the temperature current conversion circuit comprises:
an amplifier configured to equalize a first voltage of a first input node to a second voltage of a second input node;
a first nonlinearity adjustment circuit connected to the first input node and configured to adjust the nonlinearity of the temperature clock signal based on the control signal;
a second nonlinearity adjustment circuit connected to the second input node and configured to adjust the nonlinearity of the temperature clock signal based on the control signal; and
a bias current generator configured to generate the temperature bias signal based on a voltage applied to an output node of the amplifier.

8. The temperature sensor of claim 7, wherein
the first nonlinearity adjustment circuit is further configured to adjust the nonlinearity of the temperature clock signal in a first direction, and
the second nonlinearity adjustment circuit is further configured to adjust the nonlinearity of the temperature clock signal in a second direction.

9. The temperature sensor of claim 6, wherein the clock generation circuit comprises:
a capacitor;
a switch circuit configured to charge the capacitor or discharge an electric charge of the capacitor based on the temperature bias signal;
a comparator configured to output a comparison result obtained by comparing a first threshold voltage and a second threshold voltage based on a voltage stored in the capacitor; and
a logic configured to output the temperature clock signal based on the comparison result output by the comparator.

10. A temperature sensor comprising:
a temperature clock generator configured to generate a temperature clock signal based on a control signal to adjust a nonlinearity of the temperature clock signal;
a reference clock generator configured to generate a reference clock signal; and
a counter circuit configured to output a count signal by counting clocks of the temperature clock signal corresponding to a counting interval of the reference clock signal,
wherein the reference clock generator comprises:
a capacitor;
a switch circuit configured to charge the capacitor or discharge an electric charge of the capacitor based on a reference bias current;
a comparator configured to output a comparison result obtained by comparing a first threshold voltage and a second threshold voltage based on a voltage stored in the capacitor; and
a logic configured to output the reference clock signal based on the comparison result output by the comparator.

11. A method of sensing a temperature, the method comprising:
receiving a control signal to adjust a nonlinearity of a temperature clock signal;
generating the temperature clock signal based on the control signal; and
outputting a count signal by counting clocks of the temperature clock signal corresponding to a counting interval of a reference clock signal
wherein the receiving of the control signal is performed by a temperature clock generator that comprises a nonlinearity adjustment circuit comprising:
resistors with nonlinear resistance values, and
a switch circuit configured to control a connection between the resistors based on the control signal.

12. The method of claim 11, wherein the generating of the temperature clock signal comprises controlling a device with a nonlinear value based on the control signal, and adjusting the nonlinearity of the temperature clock signal.

13. A non-transitory computer-readable medium storing instructions that, when executed by a processor, causes the processor to perform the method of claim 11.

\* \* \* \* \*